United States Patent
Rezaiifar et al.

(10) Patent No.: US 9,729,467 B2
(45) Date of Patent: Aug. 8, 2017

(54) METHOD AND APPARATUS FOR MANAGING CONGESTION IN A WIRELESS SYSTEM

(75) Inventors: Ramin Rezaiifar, San Diego, CA (US); Peerapol Tinnakornsrisuphap, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1910 days.

(21) Appl. No.: 12/703,665

(22) Filed: Feb. 10, 2010

(65) Prior Publication Data

US 2010/0293275 A1 Nov. 18, 2010

Related U.S. Application Data

(60) Provisional application No. 61/177,531, filed on May 12, 2009.

(51) Int. Cl.
*G06F 15/173* (2006.01)
*H04L 12/911* (2013.01)
(Continued)

(52) U.S. Cl.
CPC .......... *H04L 47/824* (2013.01); *H04L 47/14* (2013.01); *H04L 47/21* (2013.01); *H04L 47/215* (2013.01);
(Continued)

(58) Field of Classification Search
CPC ......... H04L 47/10; H04L 47/14; H04L 47/20; H04L 47/21; H04L 47/215;
(Continued)

(56) References Cited

U.S. PATENT DOCUMENTS

2002/0089956 A1* 7/2002 Haugli et al. ................. 370/335
2003/0195983 A1* 10/2003 Krause .......................... 709/238
(Continued)

FOREIGN PATENT DOCUMENTS

CN    1342381 A    3/2002
JP    2004112780 A    4/2004
(Continued)

OTHER PUBLICATIONS

3rd Generation Partnership Project 2 3GPP2: "3GPP2 C.S0024-B Version 2.0 cdma2000 High Rate Packet Data Air Interface Specification cclma2000 High Rate Packet Data Air Interface Specification" 3GPP2 C.S0024-B,, no. Version 2.0, Mar. 1, 2007 (Mar. 1, 2007).
(Continued)

*Primary Examiner* — Oleg Survillo
(74) *Attorney, Agent, or Firm* — Haojin Wang; Michael J. DeHaemer, Jr.

(57) ABSTRACT

Systems and methodologies are described herein that facilitate congestion control in a wireless communication system. As described herein, an access network and associated terminals can utilize a token bucket access control mechanism, through which respective terminals can be allotted access tokens and/or other units for access to the access network. For example, upon requesting access to a given network, a user of the network can determine whether sufficient access tokens have been accumulated, based on which the request can be selectively allowed or denied. As further described herein, multiple token bucket mechanisms can be utilized, which can correspond to respective packet flows or the like. Additionally, token bucket access control can be implemented as described herein in cooperation with conventional access persistence functionality. Further aspects described herein facilitate the adjustment of token
(Continued)

bucket parameters for network access control based on network loading.

71 Claims, 14 Drawing Sheets

(51) Int. Cl.
H04L 12/819 (2013.01)
H04L 12/825 (2013.01)
H04W 28/10 (2009.01)
H04L 12/24 (2006.01)
H04L 12/813 (2013.01)
H04L 12/26 (2006.01)
H04L 12/851 (2013.01)
H04L 12/801 (2013.01)
H04W 28/22 (2009.01)
H04W 48/16 (2009.01)
H04W 74/00 (2009.01)

(52) U.S. Cl.
CPC .............. *H04L 47/24* (2013.01); *H04L 47/25* (2013.01); *H04L 47/70* (2013.01); *H04W 28/10* (2013.01); H04L 41/5022 (2013.01); H04L 43/16 (2013.01); H04L 47/10 (2013.01); H04L 47/11 (2013.01); H04L 47/20 (2013.01); H04L 47/2483 (2013.01); *H04W 28/22* (2013.01); *H04W 48/16* (2013.01); *H04W 74/00* (2013.01)

(58) Field of Classification Search
CPC ..... H04L 41/5022; H04L 43/16; H04L 47/11; H04L 47/24; H04L 47/2483; H04L 47/824; H04L 47/25; H04L 47/70; H04W 28/10; H04W 28/22; H04W 48/16; H04W 74/00
USPC .............. 709/225; 370/320–342; 340/10–14, 340/425–428; 379/129–139
See application file for complete search history.

(56) References Cited

U.S. PATENT DOCUMENTS

| | | | |
|---|---|---|---|
| 2003/0223370 A1* | 12/2003 | Jain et al. ..................... 370/235 |
| 2004/0038685 A1 | 2/2004 | Nakabayashi |
| 2004/0095914 A1* | 5/2004 | Katsube et al. .............. 370/338 |
| 2005/0149724 A1* | 7/2005 | Graff ............................ 713/156 |
| 2005/0174944 A1* | 8/2005 | Legault et al. ............ 370/235.1 |
| 2005/0235308 A1* | 10/2005 | Dellow et al. .................. 725/25 |
| 2006/0191017 A1* | 8/2006 | Hieda ................. G06F 21/6218 726/27 |
| 2006/0203724 A1 | 9/2006 | Ghosh et al. |
| 2006/0265507 A1* | 11/2006 | Banga et al. .................. 709/228 |
| 2007/0026884 A1* | 2/2007 | Rao ............................... 455/522 |
| 2007/0086483 A1* | 4/2007 | Greenberg .................... 370/468 |
| 2007/0101422 A1* | 5/2007 | Carpenter .............. H04L 63/02 726/13 |
| 2007/0153798 A1* | 7/2007 | Krstulich ..................... 370/392 |
| 2007/0153921 A1 | 7/2007 | Nakabayashi |
| 2007/0171823 A1* | 7/2007 | Hunt et al. .................... 370/232 |
| 2007/0201388 A1 | 8/2007 | Shah et al. |
| 2007/0208937 A1* | 9/2007 | Cam-Winget ........ H04L 9/0844 713/168 |
| 2008/0168547 A1* | 7/2008 | Cheeniyil ............ G06Q 20/206 726/6 |
| 2008/0222045 A1* | 9/2008 | Mukerji .................. H04L 63/08 705/59 |
| 2009/0083835 A1* | 3/2009 | Olson ................. H04L 63/1416 726/3 |
| 2009/0198385 A1* | 8/2009 | Oe et al. ....................... 700/296 |
| 2009/0213734 A1* | 8/2009 | Hashinaga et al. ........... 370/235 |
| 2009/0276204 A1* | 11/2009 | Kumar et al. .................. 703/21 |
| 2010/0057485 A1* | 3/2010 | Luft ................................. 705/1 |
| 2010/0085874 A1* | 4/2010 | Noy et al. ..................... 370/230 |
| 2010/0154024 A1* | 6/2010 | Boxmeyer .............. G06F 21/85 726/1 |
| 2010/0192201 A1* | 7/2010 | Shimoni et al. .................. 726/3 |
| 2010/0296494 A1* | 11/2010 | Kanodia et al. .............. 370/336 |
| 2011/0013529 A1* | 1/2011 | Bin ...................... H04L 12/2878 370/252 |
| 2015/0019730 A1* | 1/2015 | Fertell ............... H04L 29/12009 709/225 |

FOREIGN PATENT DOCUMENTS

| | | |
|---|---|---|
| JP | 2007142544 A | 6/2007 |
| JP | 2009505574 A | 2/2009 |
| JP | 2012510853 A | 5/2012 |
| WO | 2007021608 A2 | 2/2007 |
| WO | WO-2007090176 | 8/2007 |

OTHER PUBLICATIONS

Attar R, Lott C, Ghosh D, Wang A, Chakrabarti A, Gurelli M: "DO-Revision C Overview and Update" 3GPP2—Drafts, 2500 Wilson Boulevard, Suite 300, Arlington, Virginia 22201, USA, May 11, 2009 (May 11, 2009), pp. 1-45, XP040481820 p. 34.

Attar R, Lott C: "Token Bucket for Access Attempts" 3GPP2—Drafts, 2500 Wilson Boulevard, Suite 300, Arlington, Virginia 22201, USA, Aug. 1, 2008 (Aug. 1, 2008), pp. 1-4, XP040480929 p. 4 p. 2-p. 3.

International Search Report and Written Opinion ,PCT/US2010/033689, International Search Authority—European Patent Office—Sep. 22, 2010.

Tinnakornsrisuphap P., et al., "Token Bucket mechanism for Controlling Access Channel Congestion 3GPP2—Drafts, 2500 Wilson Boulevard, Suite 300, Arlington, Virginia 22201, USA, XP040481642," 2009, pp. 1-12.

Taiwan Search Report—TW099115183—TIPO—Jun. 20, 2013.

* cited by examiner

METHOD AND APPARATUS FOR MANAGING CONGESTION IN A WIRELESS SYSTEM

CLAIM OF PRIORITY UNDER 35 U.S.C. §119

The present Application for Patent claims priority to U.S. Provisional Application Ser. No. 61/177,531, filed May 12, 2009, entitled "METHOD AND APPARATUS FOR MANAGING CONGESTION IN A WIRELESS SYSTEM," assigned to the assignee hereof and hereby expressly incorporated by reference in its entirety.

BACKGROUND

I. Field

The present disclosure relates generally to wireless communications, and more specifically to techniques for facilitating failure recovery and network/device synchronization in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

In order to conserve traffic communicated through a wireless system and reduce network congestion, connections between a wireless system and a device operating thereon can be configured to persist only for a limited amount of inactivity. However, various wireless devices can be configured as generally known in the art to transmit keep-alive messages and/or other similar messages to an associated network at various intervals in order to keep an idle connection with the network active beyond network-specified maximum idle periods. Accordingly, to reduce network congestion in the presence of keep-alive messages and/or similar communications, it would be desirable to implement techniques for controlling the rate at which a device is permitted to access an associated communication system.

Various devices operable in a wireless communication environment can be designed according to an open access scheme and/or other suitable access schemes, wherein a device can be activated for use on any suitable network (e.g., maintained by any suitable network operator) upon purchase of the device from a vendor and/or other triggering events.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise obtaining one or more access rules relating to a network, the one or more access rules specifying a rate at which permitted accesses to the network accumulate specified as an amount of permitted accessed per unit of time and selectively accessing the network according to the rate at which permitted accesses to the network accumulate.

A second aspect described herein relates to a wireless communications apparatus, which can comprise a memory that stores data relating to an associated network and one or more rates of accrual for permitted accesses to the associated network given in terms of permitted accesses to the associated network per unit of time. The wireless communications apparatus can further comprise a processor configured to identify a request to access the associated network and to selectively allow the request to access the associated network according to the one or more rates of accrual for permitted accesses to the associated network.

A third aspect relates to an apparatus, which can comprise means for receiving information relating to an accumulation rate for access tokens associated with a network, the accumulation rate for access tokens given as an amount of access tokens accumulated per unit of time and means for selectively allowing a request to access the network according to the accumulation rate for access tokens.

A fourth aspect described herein relates to a computer program product, which can include a computer-readable medium that comprises code for causing a computer to receive information relating to an accumulation rate for access tokens associated with a network, the accumulation rate for access tokens given as an amount of access tokens accumulated per unit of time and code for causing a computer to selectively allow a request to access the network according to the accumulation rate for access tokens.

According to a fifth aspect, a method is described herein. The method can comprise defining one or more access rules relating to an associated network, the one or more access rules comprising a rate of accrual for permitted accesses to the associated network and conveying the one or more access rules to respective users of the associated network.

A sixth aspect described herein relates to a wireless communications apparatus, which can comprise a memory that stores data relating to at least one network user and a network serving the at least one network user. The wireless communications apparatus can further comprise a processor configured to define one or more access rules relating to the network serving the at least one network user, the one or more access rules comprising a rate of accrual for permitted accesses to the network serving the at least one network user, and to conveying the one or more access rules to the at least one network user.

A seventh aspect relates to an apparatus, which can comprise means for defining an accumulation rate for permitted access requests utilized by an associated network and means for advertising the accumulation rate for permitted access requests to at least one terminal served by the associated network.

An eighth aspect described herein relates to a computer program product, which can include a computer-readable medium that comprises code for causing a computer to define an accumulation rate for permitted access requests utilized by an associated network and code for causing a computer to advertise the accumulation rate for permitted access requests to at least one terminal served by the associated network.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
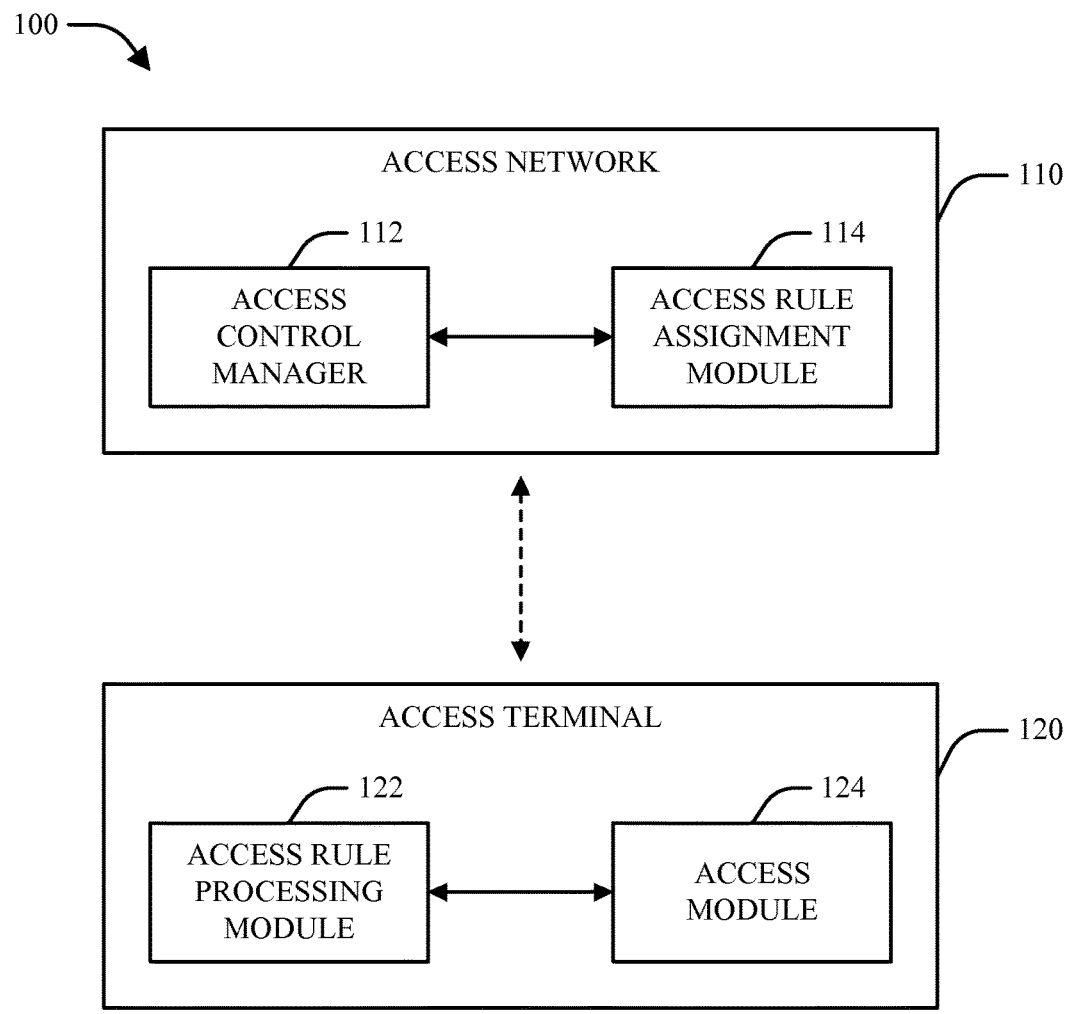
FIG. 1 is a block diagram of a system for managing congestion in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 for managing congestion in a wireless communication system in accordance with various aspects described herein. As FIG. 1 illustrates, system 100 can include an access network (AN, also referred to herein as a base station, Node B, Evolved Node B (eNB), etc.) 110, which can communicate with one or more access terminals (ATs, also referred to herein as user equipment units (UEs), mobile devices or terminals, user devices or "users," etc.) 120. In one example, AT 120 can engage in one or more uplink (UL, also referred to as reverse link (RL)) communications to AN 110, and AN 110 can engage in one or more downlink (DL, also referred to as forward link (FL)) communications to AT 120.

As mobile device technology advances, it can be observed that ATs 120 and/or other devices operable in a wireless communication environment are beginning to exhibit enhanced data characteristics in addition to those associated with traditional data applications (e.g., web browsing, etc.). For example, push-oriented applications (e.g., applications that provide instant delivery of e-mails, instant messages, notifications, etc.) and the like can generate frequent pages to ATs 120, each of which can lead to an access attempt and connection re-establishment with AN 110.

Additionally or alternatively, ATs 120 can be configured to access AN 110 with significant frequency based on applications, user behaviors, or the like, even when not paged. By way of example, system 100 can utilize open access policies and/or other access policies, wherein an AT 120 can be acquired from a vendor and/or any other suitable source and activated on any compatible AN(s) 110. Such open access policies can cause a loss of network controllability of respective ATs 120. For example, AN 110 in such an example may not have the ability to control ATs 120 and/or their respective users from utilizing keep-alive messages (e.g., ping messages) or the like to prevent a connection from closing due to inactivity (e.g., due to delays, complexity, and/or other costs associated with re-opening a closed connection). Accordingly, it can be appreciated that such behaviors, when exhibited by a large number of ATs 120 in a small geographical area, can in some cases generate access channel congestion on AN 110 and/or other network issues.

In accordance with one aspect, access channel congestion associated with AN 110 can give rise to various consequences that can negatively impact performance of system 100. For example, access channel congestion on AN 110 can lead to excessive delay with respect to setting up connections, which can in turn lead to poor user experiences. Further, increased blocking can result, wherein some ATs 120 may be unable to access AN 110 even after several rounds of attempts. This can, in turn, cause the affected ATs 120 to fall back to a system determination and/or reselection. In addition, access channel congestion can cause reduced RL capacity in the event that, for example, the congestion causes ATs 120 to increase their access probe power to access AN 110. Additionally or alternatively, congestion can cause link budget degradation associated with AN 110 and/or other negative effects.

As stated above, mobile devices (such as ATs 120 or the like) may in some cases send small keep-alive packets and/or other information in order to hold on to a channel associated with AN 110. Thus, even when overload control causes connections between ATs 120 and AN 110 to be terminated, various users can continue to access AN 110 periodically, thereby increasing the load on the access channel and the RL in general.

Conventionally, communication systems attempt to address this and other similar congestion issues using solutions that involve adjusting the persistence values associated with the access probes of respective associated mobile devices, denying a given mobile device a connection and instructing it to back off for a predetermined amount of time, or the like. For example, access persistence probability schemes traditionally utilized to avoid collisions between mobile devices can be adapted to provide congestion control. By way of specific, non-limiting example, an access persistence scheme can be conducted wherein a mobile device generates a uniform random number (e.g., between 0 and 1) upon requesting access to an associated communication system. The number generated by the mobile device can then be compared to a threshold set and advertised by the communication system, based on which access to the system can be selectively allowed or denied. By way of example, access can be granted upon determining that the number generated by the mobile device is less than the threshold set by the system or denied otherwise. Accordingly, by increasing or decreasing the access persistence threshold value, a communication system can increase or decrease the probability that a user will be able to access the system on a given attempt.

It can be appreciated that the above example access persistence scheme, and/or other similar schemes wherein a mobile device performs an access persistence test prior to conducting an initial access probe, can be applicable to substantially all mobile device revisions in a way that is effective at controlling overall access channel load and is dynamically adaptable based on RL and/or access channel load. However, as access persistence schemes are conventionally designed primarily as a collision avoidance mechanism rather than an access control mechanism, various shortcomings emerge when such schemes are applied to access control. For example, it can be appreciated that access persistence schemes can increase overall connection setup delays for all users of an associated system, including those users that have not accessed the system for a relatively long time as compared to other users (e.g., thereby not contributing to system congestion issues). These delays can be perceived by a device user as system slowdown in some cases, thereby degrading the overall experience of the user. Moreover, in the event that a utilized access persistence test involves the generation and use of random parameters such as those discussed above, connection delays can be significantly inconsistent from access to access. In addition, it can be appreciated that access persistence schemes such as those described above do not effectively motivate devices that generate large amounts of access attempts to slow the generation of such attempts; in fact, it can be appreciated that such schemes can in some cases motivate a device to reconnect immediately when its connection is closed due to overload control even if the device does not have any data to be communicated.

Similarly, simply adjusting persistence parameters and/or backoff parameters with respect to a conventional scheme as described above increases connection setup time (e.g., when the system is loaded) even for devices that have not contributed to the access channel load by accessing the system frequently (e.g., such that "well-behaved" devices are in some cases treated unfairly). Further, it can be appreciated that adjusting persistence and/or backoff parameters on a per-user basis (e.g., based on a particular user's number of accesses per second) is not a practical solution as it requires information to be collected and maintained for each user. In addition, while overload control as described above decreases the probability of blocking, it is not effective to prevent access channel overload in the event that applications generate frequent keep-alive packets. Accordingly, it can be appreciated that mechanisms to control the frequency by which ATs 120 can access AN 110 without impacting other, well-behaved ATs 120 are desirable.

In view of the above shortcomings of conventional access control mechanisms, AN 110 can, in accordance with one aspect, utilize an access control manager 112 that defines one or more access rules relating to AN 110. Upon definition of respective access rules, one or more access rules can be conveyed to respective ATs 120 via an access rule assignment module 114. In one example, respective access rules defined by access control manager 112 can include information relating to a rate of accrual for permitted accesses to AN 110. Based on the rate of accrual for permitted accesses to AN 110 and/or other suitable information, respective access rules defined by access control manager 112 can facilitate selective allowance of accesses to AN 110 by respective ATs 120.

Figure 2:
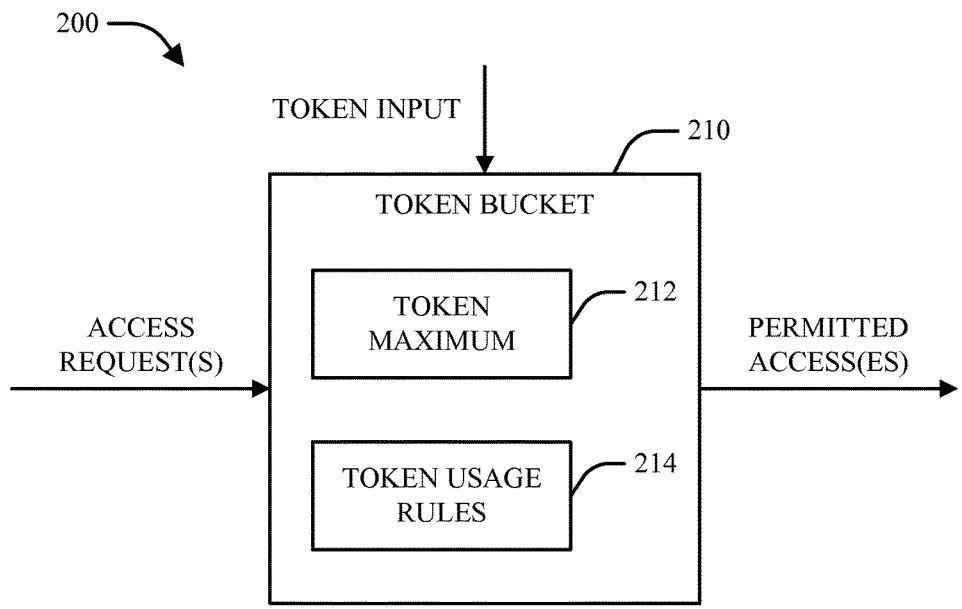
FIG. 2 is a block diagram of a system for implementing a token bucket access scheme for a wireless communication environment in accordance with various aspects.

In accordance with one aspect, access control manager 112 and/or other means associated with AN 110 can utilize a token bucket mechanism for control of access channels associated with AN 110. For example, as shown in system 200 in FIG. 2, access rules can be defined such that access requests are processed via a token bucket 210. As further shown in system 200, token bucket 210 can receive and/or otherwise accrue tokens or other units as input, based on which an access request can be processed (e.g., in combination with a token maximum 212 and/or token usage rules 214, as described in further detail herein) to identify accesses to be allowed from among the requested accesses. By way of example, one or more defined access rules can utilize token bucket 210 to facilitate allowance of an access to an associated network if a user of the associated network has accrued a permitted access to the associated network (e.g., as represented by one or more tokens). Alternatively, token bucket 210 can facilitate denial of the request if the user has not accrued a permitted access to the associated network. Further, upon allowance of an access to the associated network, token bucket 210 can facilitate removal of an accrued permitted access to the associated network corresponding to the user.

In general, it can be appreciated that a token bucket, such as token bucket 210, is a control mechanism that can dictate when traffic can be communicated based on the presence of accrued "tokens" by a structure that queues and/or otherwise maintains network traffic to be communicated. In one example, a token bucket can contain respective tokens, each of which can represent a unit of bytes, packets, and/or other units of information. Accrued tokens can be removed according to predefined token usage rules in exchange for the ability to transmit data. In one example, a network administrator and/or other suitable entity can adjust token usage rules and/or other means to specify a amount of tokens required for transmission of a predetermined amount of data. Accordingly, a flow can be enabled to transmit when tokens are present but prohibited from transmission when tokens are not present.

By way of example, token usage rules 214 can specify that a token is added to token bucket 210 at a predefined rate (e.g., one token every n seconds). Further, token bucket 210 can be associated with a token maximum 212, such that token bucket 210 can be configured to hold no more than a number of tokens specified by token maximum 212 (e.g., by discarding tokens that accrue when token bucket 210 already holds the maximum number of tokens). Subsequently, when a packet of data arrives, a predefined number of tokens can be removed from token bucket 210 before enabling the packet to be transmitted. However, if fewer than the required number of tokens are available, the number of tokens present at token bucket 210 can instead remain unchanged and the corresponding packet can be considered non-conformant. In various examples, non-conformant packets can be dropped, queued for subsequent transmission (e.g., upon accrual of sufficient tokens), transmitted as non-conformant (e.g., such that the packet can subsequently be dropped if the network is determined to be overloaded), and/or handled in any other suitable manner(s).

In accordance with another aspect, various types of token buckets can be utilized for controlling access to a communication environment associated with system 200. These can include, for example, default access buckets, Page Response buckets, per-flow buckets (e.g., per Flow Profile ID buckets), or the like. In addition, a token bucket of any appropriate type can be configured with various parameters to control operation of the token bucket. These parameters can include, for example, an AccessTokenBucketSize parameter that specifies a maximum number of tokens that can be stored in the bucket. In one example, an AccessTokenBucketSize parameter set to 0 can indicate a disabled token bucket. Further, an AccessTokenAddPeriod parameter can be utilized that specifies a number of slots before a token is added to the token bucket. In addition, an AccessTokenPersistenceOffset parameter can be utilized to manage coexistence between the token bucket and access persistence and/or other access control or collision avoidance mechanisms. The operation of the above parameters and/or other suitable parameters are described in further detail herein.

Returning to FIG. 1, access control manager 112 associated with AN 110 can generate respective access rules, which can be provided via an access rule assignment module 114 to AT 120. Subsequently, AT 120 can utilize an access rule processing module 122 to obtain one or more access rules relating to AN 110. In one example, access rules provided from AN 110 to AT 120 can facilitate the maintenance of a token bucket (e.g., token bucket 210) by an access module 124 and/or other suitable mechanisms associated with AT 120. The access rules can specify a rate at which permitted accesses to AN 110 accumulate such that a token bucket maintained by AT 120 can govern the rate at which AT 120 accesses AN 110 (e.g., in terms of accesses per second, etc.). By facilitating maintenance of an token bucket access control mechanism by AT 120, it can be appreciated that the rate at which ATs 120 can access AN 110 can be regulated without requiring AN 110 to maintain information about each AT 120.

In accordance with one aspect, respective ATs 120 in system 100 can leverage token bucket access control mechanisms in an associated access channel media access control (MAC) entity as generally described above. By utilizing such a mechanism, AT 120 can be configured to maintain one or more token buckets that govern the rate at which it can access AN 110, thereby providing access control in a fair manner such that applications and/or ATs 120 that contribute to access congestion are controlled while other applications and/or ATs 120 are not affected. In addition, as AN 110 is provided with the ability to advertise and/or otherwise specify a maximum rate at which accesses to AN 110 can be conducted, ATs 120 and/or applications running thereon can be dissuaded from requesting network accesses of relatively low utility (e.g., keep-alive packets), thereby keeping communication channels open for communication packets of higher utility.

In accordance with another aspect, access rule processing module 122 can identify and process respective access rules provided by AN 110 as described above. Subsequently, upon identifying a request by AT 120 to access AN 110, access rule processing module 122 can determine a number of accumulated permitted accesses according to the respective access rules and/or take any other suitable action(s). Based on the determination of accumulated permitted accesses, access module 124 can selectively allow the request to access AN 110 upon determining that the number of accumulated permitted accesses is greater than or equal to a predefined number of permitted accesses required for allowing the request to access AN 110.

Figure 3:
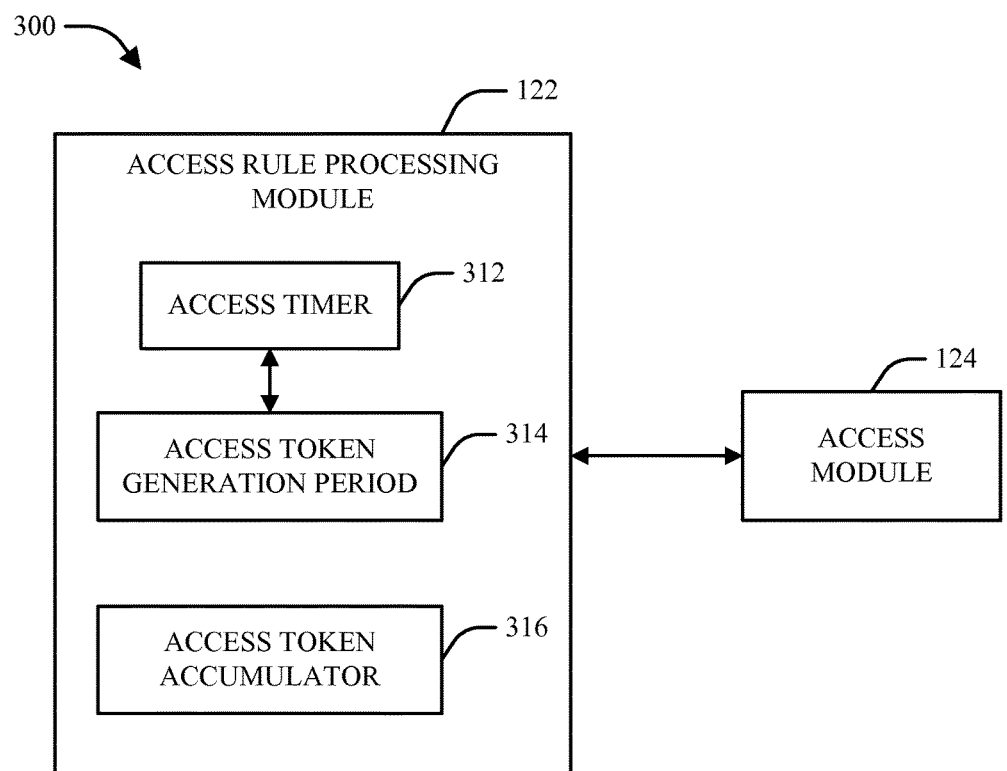
FIG. 3 is a block diagram of a system for processing access rules for a wireless network according to a token bucket access scheme in accordance with various aspects.

An example of operation of access rule processing module 122 is illustrated in further detail by system 300 in FIG. 3. As system 300 illustrates, access rule processing module 122 can include an access timer 312 that can determine an elapsed time from a previous request to access an associated network, which can be utilized to compute a number of newly or additional accumulated permitted accesses (e.g., from a previously accumulated amount of permitted accesses) as a function of the elapsed time from the previous request to access the network and a rate at which permitted accesses to the network accumulate (e.g., as given by access token generation period 314). The number of additional accumulated permitted accesses can then be added (e.g., by an access token accumulator 316 or the like) to a number of previously accumulated permitted accesses. In one example, access rules processed by access rule processing module 122 can specify a maximum number of permitted accesses such that access token accumulator 316 can add the number of additional accumulated permitted accesses to a number of previously accumulated permitted accesses subject to the maximum number of permitted accesses.

Upon determining a number of accumulated permitted accesses, access module 124 can be utilized to selectively allow or deny an access to an associated network as described in accordance with various aspects herein. In one example, upon allowing an access to access a network, access module 124 can subtract a predefined number of permitted accesses (e.g., 1 access) required for allowing the request to access the network from the number of accumulated permitted accesses upon allowing the request. Alternatively, access module 124 can deny a request to access a network upon determining that the number of accumulated permitted accesses is less than a predefined number of permitted accesses required for allowing the request to access the network. In one example, a denial can be made in this manner pending accumulation of sufficient permitted accesses.

In accordance with one aspect, access token accumulator 316 and/or other suitable means within access rule processing module 122 can manage the accumulation of permitted network accesses, or access tokens, in the following manner. It should be appreciated, however, that the following is provided by way of specific example and not limitation and that, unless explicitly stated otherwise, the hereto appended claims are not intended to be limited to any specific implementation(s).

Initially, access rule processing module 122 can maintain a set of variables using a token bucket update procedure at respective access attempts. These variables can include a number $N_{token}$ of tokens currently stored in the token bucket (e.g., as an integer value between 0 and an access token bucket size parameter), a current time $T_{now}$, the time $T_{last\_update}$ of the last time $N_{token}$ was updated, a variable $T_{carried\_over}$ to account for the amount of time (e.g., in slots) not accounted for in previous token generation (e.g., as an integer value between 0 and access token generation period 314 minus one slot), or the like.

Based on the above variables, the following procedure can be conducted upon identifying an access attempt. First, the number of tokens generated since the last bucket update $N_{token\_add}$ can be calculated as follows:

$$N_{token\_add} = \left\lfloor \frac{T_{now} - T_{last\_update} + T_{carried\_over}}{AccessTokenAddPeriod} \right\rfloor,$$

wherein AccessTokenAddPeriod is initialized in a similar manner to that described above and corresponds to access token generation period 314. Next, the token bucket can be updated using the following formulas:

$$N_{token} \leftarrow \min\{N_{token} + N_{token\_add}, AccessTokenBucketSize\}$$

$$T_{carried\_over} \leftarrow T_{now} - T_{last\_update} + T_{carried\_over} - AccessTokenAddPeriod \times N_{token\_add}$$

$$T_{last\_update} \leftarrow T_{now}$$

Following the token bucket update, if $N_{token}$ is found to be greater than 0, $N_{token}$ can be reduced by 1 and the access procedure can be conducted pending success or failure of the access. Otherwise, the access can be denied pending expiration of access token generation period 314 minus $T_{carried\_over}$, at which point the above procedure can be repeated.

Figure 4:
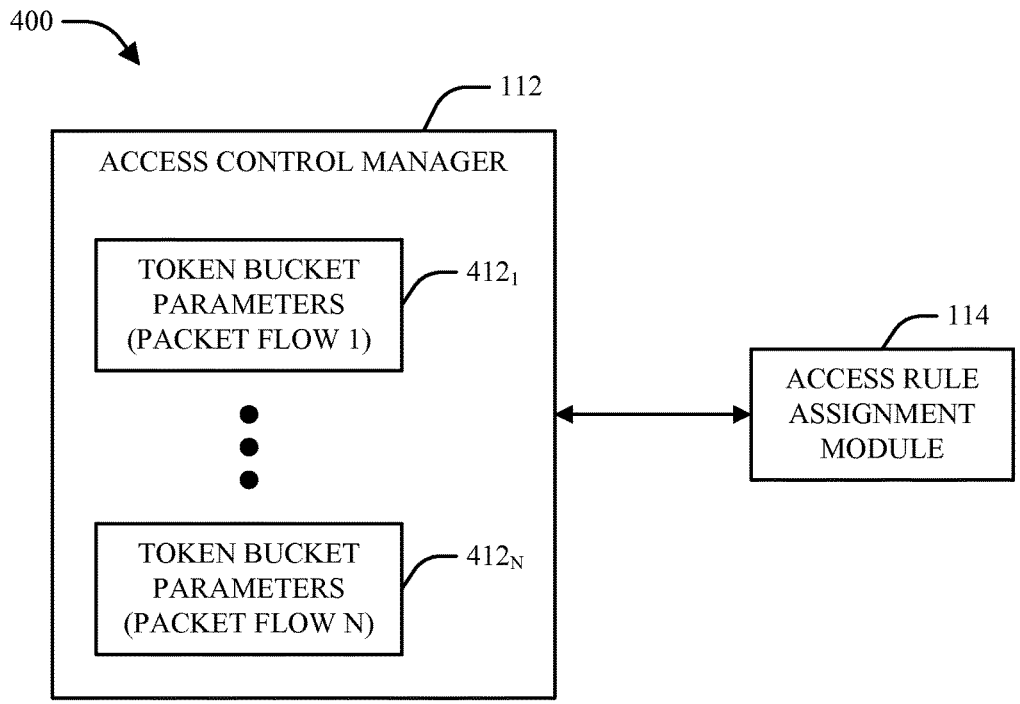
FIGS. 4-6 illustrate respective systems for managing parameters associated with an access restriction scheme utilized for a wireless communication system in accordance with various aspects.
Figure 5:
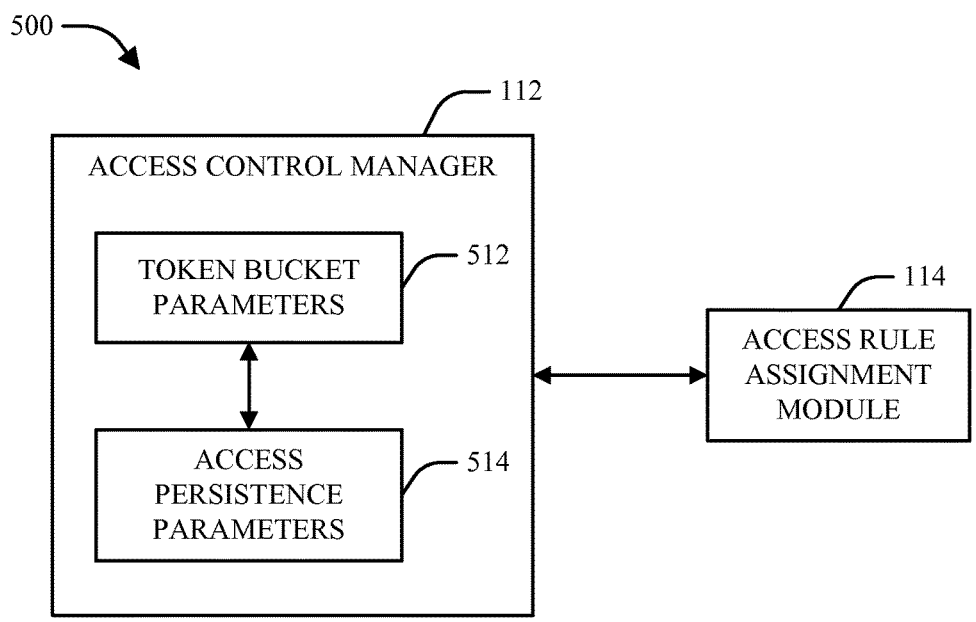
Figure 6:
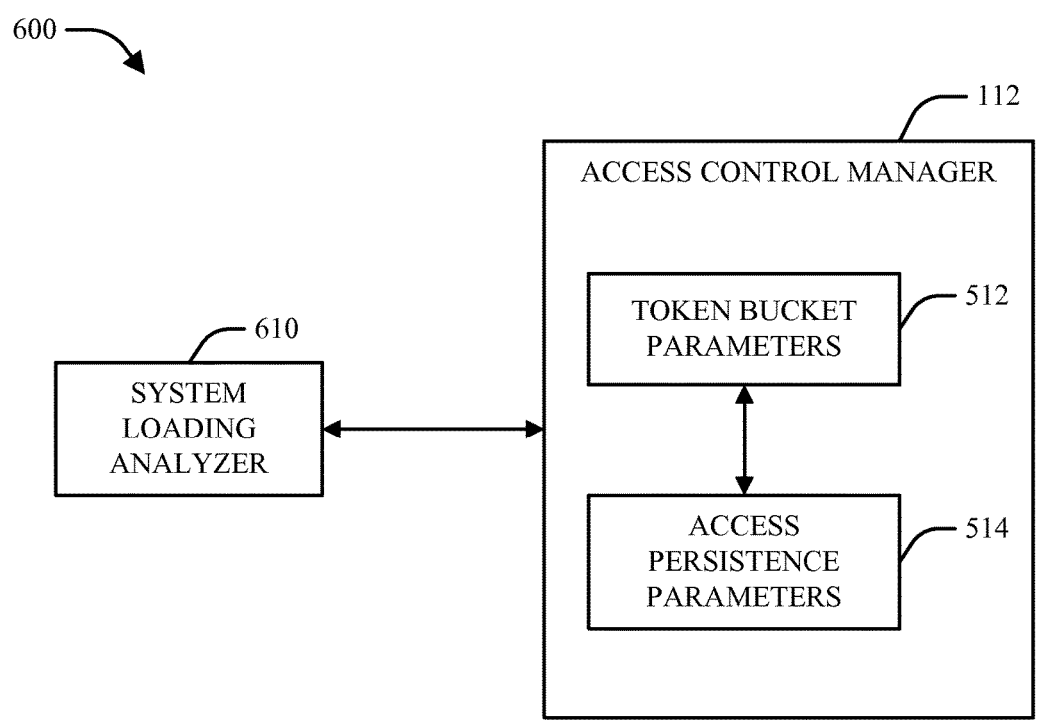

Turning next to FIGS. 4-6, respective systems 400-600 for managing parameters associated with an access restriction scheme utilized for a wireless communication system in accordance with various aspects are illustrated. It is to be appreciated that systems 400-600 are provided by way of specific, non-limiting example, and that various access control and/or congestion management mechanisms as described herein can utilize all, some, or none of the aspects illustrated by such systems. Further, unless explicitly stated otherwise, the claimed subject matter is not intended to be restricted to implementations that include any specific example(s) provided herein.

With reference first to FIG. 4, illustrated is a system 400 that facilitates adjustment of parameters associated with a token bucket access control mechanism on a per-flow basis. As illustrated by system 400, an access control manager (e.g., associated with AN 110) can identify a plurality of packet flows utilized by an associated network, based on which respective sets of parameters 412, such as rates of accrual for permitted accesses to the associated network that correspond to the respective packet flows in the plurality of packet flows, can be defined. In one example, token bucket parameters 412 for respective packet flows can be assigned to respective users via an access rule assignment module 114 for further user processing. By way of example, a user can obtain respective access rules that specify a rate at which permitted accesses to an associated network accumulate for respective packet flows, such that upon requesting access to the network, a packet flow associated with the request to access the network can be identified and a number of accumulated permitted accesses for the packet flow can be determined according to the one or more access rules. Subsequently, the request to access the network can be selectively allowed upon determining that the number of accumulated permitted accesses for the packet flow is greater than or equal to a predefined number of permitted accesses required for allowing the request to access the network.

In one example, respective packet flows can correspond to respective applications (e.g., Voice over Internet Protocol (VoIP), web browsing, etc.), traffic types, or the like. Therefore, by utilizing separate token bucket parameters 412 for different packet flows, it can be appreciated that access to an associated network can be controlled on a per-flow basis based on respective requirements of the individual packet flows (e.g., with respect to delay sensitivity, minimum data rates, etc.). Additionally or alternatively, token bucket parameters 412 can be adjusted dynamically based on changing system requirements, conditions, or the like.

In another example, while not illustrated in system 400, sets of token bucket parameters can be utilized that correspond to respective common buckets. For example, one or more token buckets can be leveraged by a wireless user with respect to responses to pages provided by an associated network. For example, when a terminal responds to a page, it can in some cases be unaware of a flow triggering the page. Accordingly, the terminal can utilize a common bucket for some or all page responses. Additionally or alternatively, a network can indicate to a user in a page message to skip bucket checking for a corresponding access.

Turning next to FIG. 5, a system 500 is illustrated that facilitates management of a token bucket access control mechanism in relation to an access persistence mechanism and/or other similar mechanisms. As shown in system 500, an access control manager 112 can manage one or more token bucket parameters 512 in relation to respective access persistence parameters 514, thereby enabling enhanced coexistence between token bucket access control mechanisms and conventional access persistence mechanisms (e.g., as generally described above). For example, as noted above, access control manager 112 can define a threshold for access persistence values such that accesses to an associated network by a user of the associated network are selectively allowed according to an access persistence value generated by the user of the associated network in relation to the threshold for access persistence values. Upon generation of such a threshold, it can be conveyed to respective users of the associated network via access rule assignment module 114.

In accordance with one aspect, as access control manager 112 can be utilized to limit and/or otherwise regulate the rate of access to the associated network, access persistence parameters 514 can be offset and/or otherwise adjusted to reduce the probability that access persistence parameters 514 will prohibit access to the network. In one example, adjustment of access persistence parameters 514 can be accomplished via an offset parameter such that access persistence tests at a corresponding terminal is performed using, e.g., a current access persistence probability reduced by the offset parameter. By doing so, it can be appreciated that additional freedom can be given to users to access the network under light load conditions, and additional conservation of network resources can be facilitated under higher load, without requiring reconfiguration of terminals.

In one example, access control manager 112 can adjust access persistence parameters 514 based on reverse link loading, access channel load, and/or any other suitable loading measurements. Further, token bucket parameters 512 can be modified depending on a level of access persistence probability and/or other suitable access persistence parameters 514. Thus, for example, it can be appreciated that a threshold for access persistence values can be adjusted in relation to a rate of accrual for permitted accesses to the associated network.

In accordance with another aspect, upon obtaining respective token bucket parameters 512 and an access persistence threshold value, a terminal and/or other suitable device upon requesting access to an associated network can generate an access persistence priority value corresponding to the request to access the network and selectively allow the request to access the network upon determining that a number of accumulated permitted accesses is greater than or equal to a predefined number of permitted accesses required for allowing the request to access the network and that the access persistence priority value is less than the access persistence threshold value.

Referring now to FIG. 6, a system 600 is illustrated that facilitates adjustment of token bucket parameters 512 and/or access persistence parameters 514 according to system loading (e.g., reverse link loading, access channel loading, etc.). As shown in system 600, a system loading analyzer 610 can identify information relating to network loading, based on which access control manager 112 can adjust token bucket parameters 512 and/or access persistence parameters 514 or perform other suitable actions. For example, access control manager 112 can adjust a rate of accrual for permitted accesses to an associated network as a function of network loading (e.g., by increasing the rate of accrual for permitted accesses to the associated network upon detecting a decrease in loading of the associated network and/or decreasing the rate of accrual for permitted accesses to the associated network upon detecting an increase in loading of the associated network). Additionally or alternatively, access control manager 112 can adjust the probability that an access persistence test will succeed with respect to a requested access as a function of network loading (e.g., by increasing probability of access upon detecting a decrease in loading and/or decreasing probability of access upon detecting an increase in loading).

In accordance with another aspect, system loading information can be utilized by an AT to facilitate adjustment of access control mechanisms employed by the AT. For example, respective sectors of an associated network can broadcast reverse link load information, which can be retrieved by the AT upon wake-up and page monitoring. Based on the value of the broadcasted reverse link load, the AT can adapt its token bucket parameters, access persistence probabilities, or the like.

Referring now to FIGS. 7-11, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
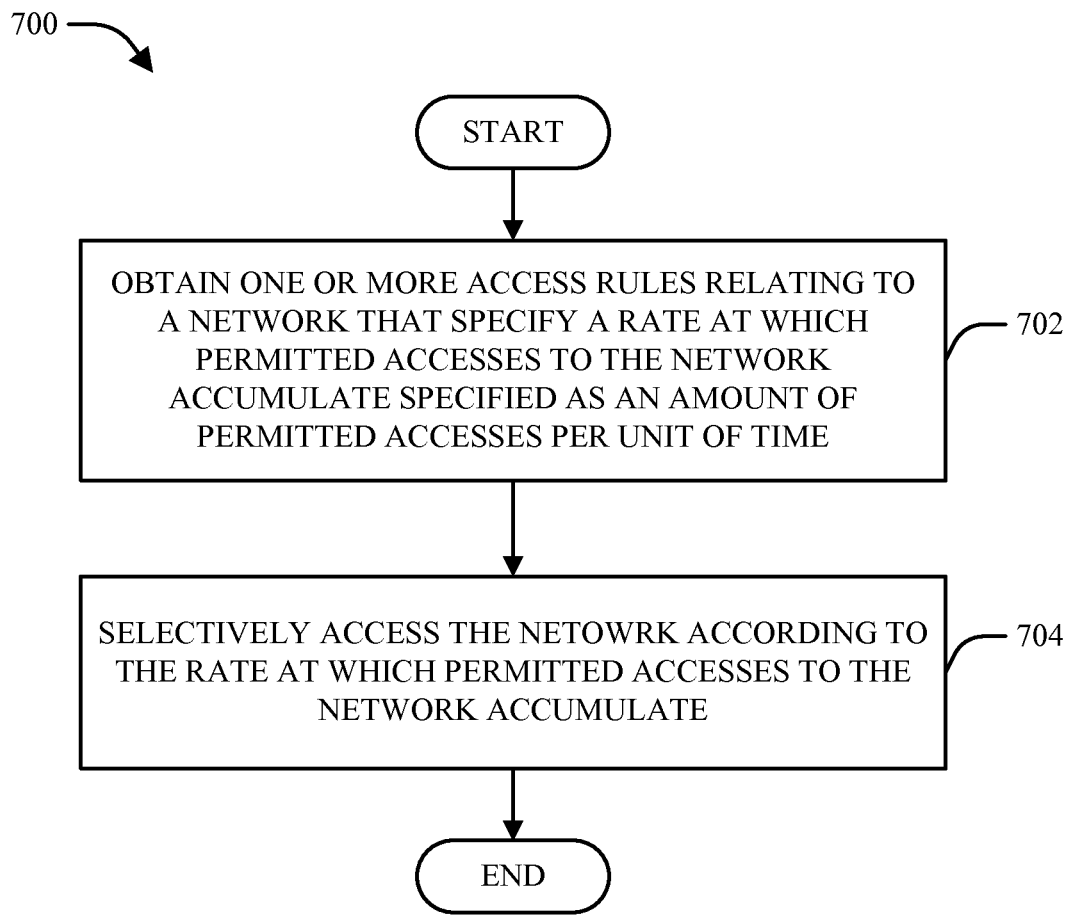
FIGS. 7-8 are flow diagrams of respective methodologies for accessing a wireless communication system according to specified access rules.

With reference to FIG. 7, illustrated is a methodology 700 for accessing a wireless communication system according to specified access rules. It is to be appreciated that methodology 700 can be performed by, for example, a user device (e.g., AT 120) and/or any other appropriate network entity. Methodology 700 begins at block 702, wherein one or more access rules relating to a network (e.g., AN 110) are obtained that specify a rate at which permitted accesses to the network accumulate (e.g., in terms of an amount of permitted accesses per unit of time). Methodology 700 can then conclude at block 704, wherein the network is selectively accesses according to the rate at which permitted accesses to the network accumulate, as identified at block 702.

Figure 8:
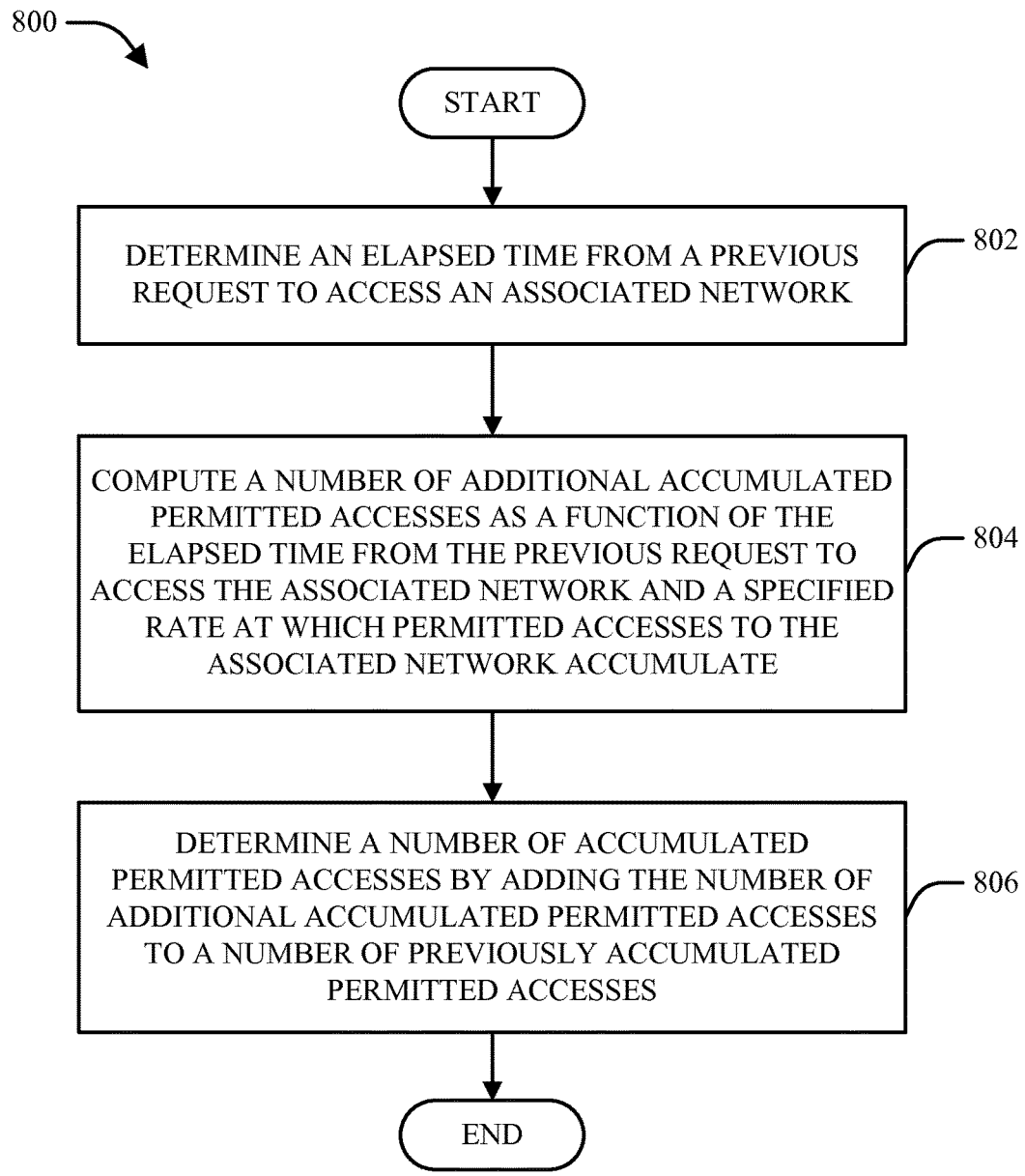

Referring next to FIG. 8, another methodology 800 for accessing a wireless communication system according to specified access rules is illustrated. Methodology 800 can be performed by, for example, a wireless terminal and/or any other appropriate network entity. In one example, methodology 800 can be utilized to carry out the determinations described at block 706 of methodology 700; alternatively, methodology 800 can be utilized independently and/or in connection with any other suitable methodologies.

Methodology 800 begins at block 802, wherein an elapsed time from a previous request to access an associated network is determined (e.g., by an access timer 312). Next, at block 804, a number of additional accumulated permitted accesses is computed (e.g., by an access token accumulator 316) as a function of the elapsed time from the previous request to access the associated network as determined at block 802 and a specified rate (e.g., given by access token generation period 314) at which permitted accesses to the associated network accumulate. Methodology 800 can then conclude at block 806, wherein a number of accumulated permitted accesses is determined by adding the number of additional accumulated permitted accesses computed at block 804 to a number of previously accumulated permitted accesses.

Figure 9:
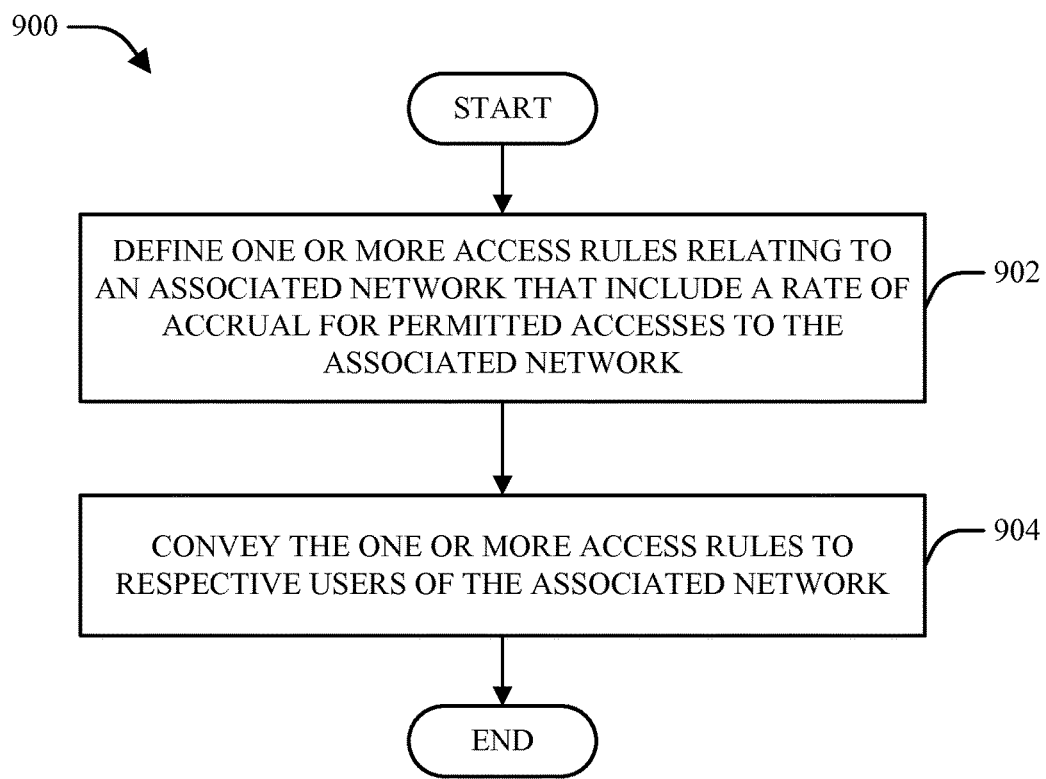
FIGS. 9-11 are flow diagrams of respective methodologies for determining and advertising respective access policies for an associated communication environment.

Turning now to FIG. 9, a flow diagram of another methodology 900 for determining and advertising respective access policies for an associated communication environment is illustrated. It can be appreciated that methodology 900 can be performed by any suitable entity associated with a communication network (e.g., AN 110). Methodology 900 begins at block 902, wherein one or more access rules relating to an associated network are defined (e.g., by an access control manager 112) that include a rate of accrual for permitted accesses to the associated network. Methodology 900 can then conclude at block 904, wherein the one or more access rules are conveyed (e.g., by an access rule assignment module 114) to respective users of the associated network.

Figure 10:
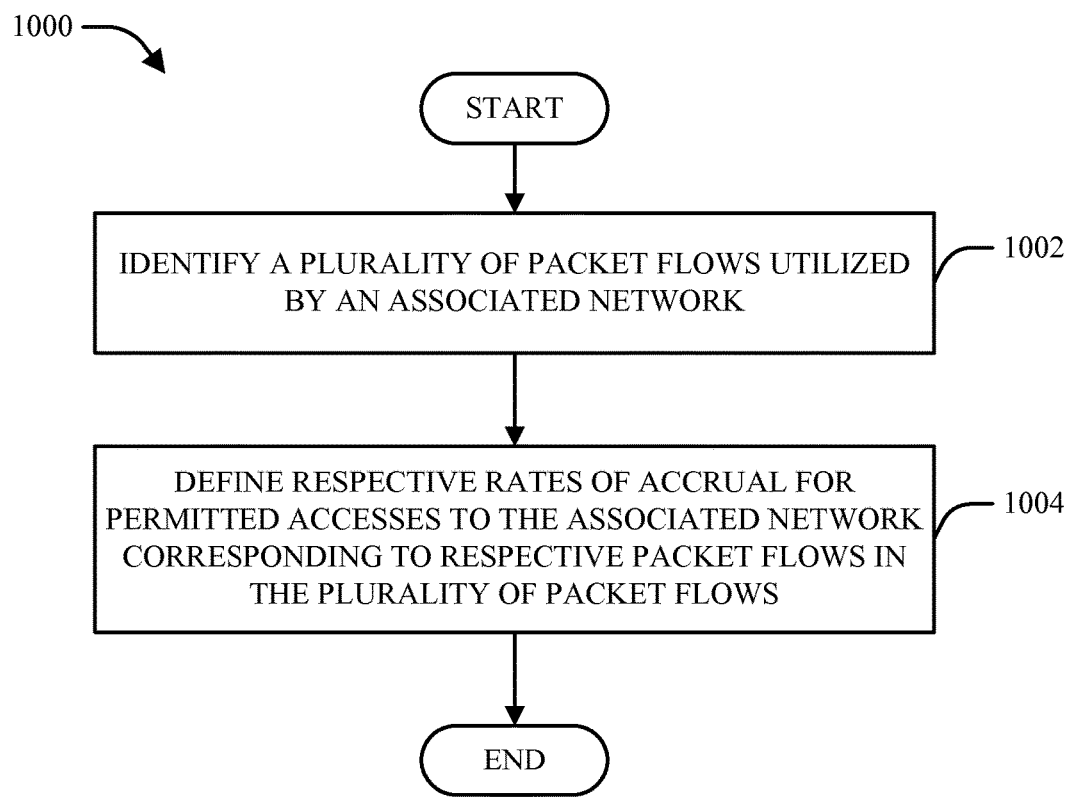

FIG. 10 illustrates another methodology 1000 for determining and advertising respective access policies for an associated communication environment. Methodology 1000 can be performed by, for example, an access network and/or any other appropriate wireless communication entity. Methodology 1000 begins at block 1002, wherein a plurality of packet flows utilized by an associated network are identified. Methodology 1000 can then conclude at block 1002, wherein respective rates of accrual for permitted accesses to the associated network are defined (e.g., as part of token bucket parameters 412) that correspond to respective packet flows in the plurality of packet flows identified at block 1002.

Figure 11:
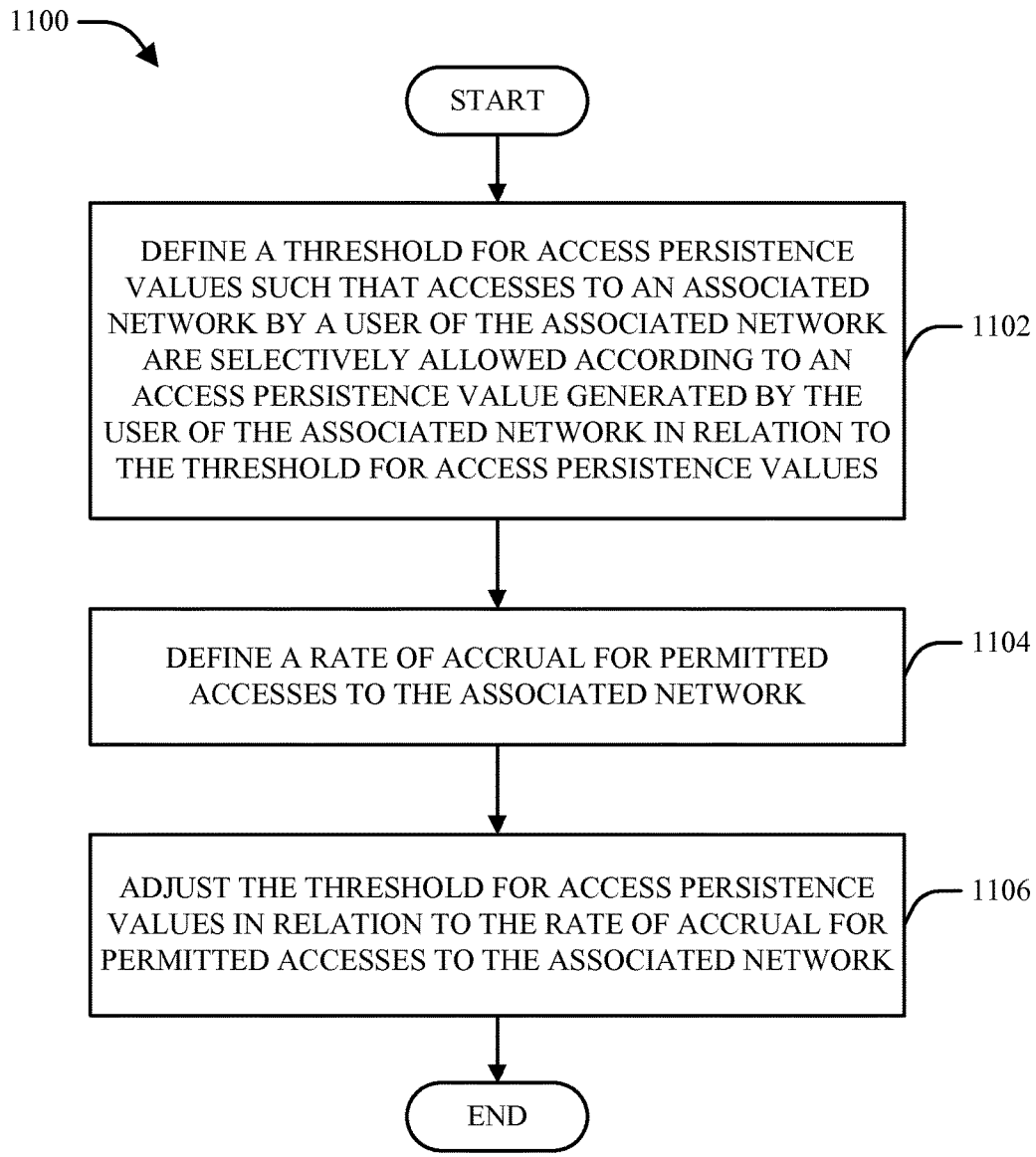

Referring next to FIG. 11, a further methodology 1100 for determining and advertising respective access policies for an associated communication environment is illustrated. Methodology 1100 can be performed by any suitable wireless network entity and begins at block 1102, wherein a threshold for access persistence values is defined (e.g., as part of access persistence parameters 514) such that accesses to an associated network by a user of the associated network are selectively allowed according to an access persistence value generated by the user of the associated network in relation to the threshold for access persistence values. Next, at block 1104, a rate of accrual for permitted accesses to the associated network is defined (e.g., as part of token bucket parameters 512). Methodology 1100 can then conclude at block 1106, wherein the threshold for access persistence values is adjusted in relation to the rate of accrual for permitted accesses to the associated network.

Figure 12:
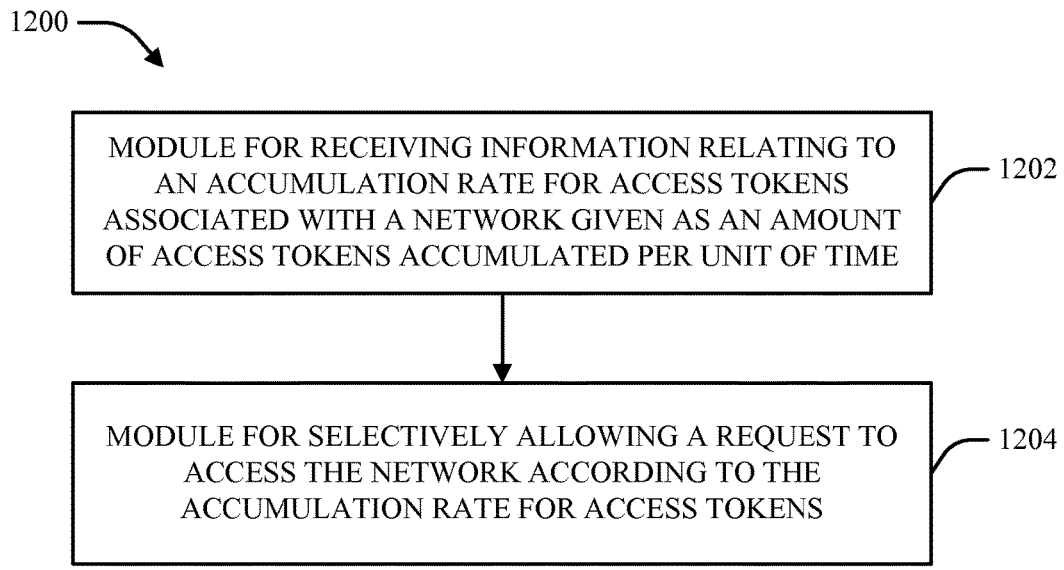
FIGS. 12-13 are block diagrams of respective apparatuses that facilitate fair access congestion control schemes within a wireless communication system.
Figure 13:
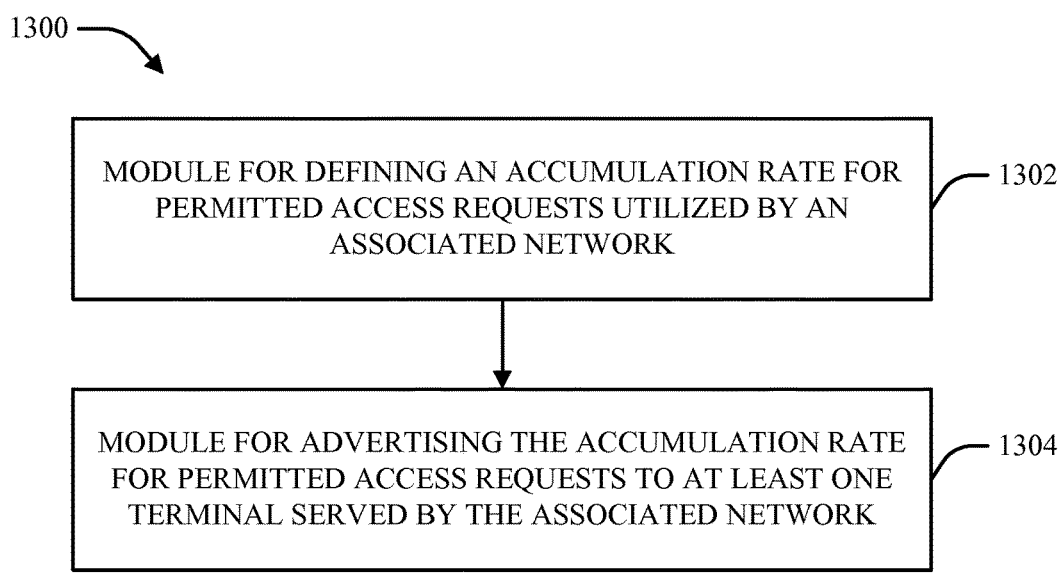

Turning to FIGS. 12-13, respective apparatuses 1200-1300 that can be utilized to implement various aspects of the claimed subject matter are illustrated. It is to be appreciated that apparatuses 1200-1300 are represented as including functional blocks, which can be functional blocks that represent functions implemented by a processor, software, or combination thereof (e.g., firmware).

With specific reference to FIG. 12, an apparatus 1200 that facilitates fair access congestion control schemes within a wireless communication system is illustrated. Apparatus 1200 can be implemented by a user device (e.g., AT 120) and/or any other suitable network entity and can include a module 1202 for receiving information relating to an accumulation rate for access tokens associated with a network given as an amount of access tokens accumulated per unit of time and a module 1204 for selectively allowing a request to access the network according to the accumulation rate for access tokens.

Turning next to FIG. 13, another apparatus 1300 that facilitates fair access congestion control schemes within a wireless communication system is illustrated. Apparatus 1300 can be implemented by an access network (e.g., AN 110) and/or any other suitable entity and can include a module 1302 for defining an accumulation rate for permitted access requests utilized by an associated network and a module 1304 for advertising the accumulation rate for permitted access requests to at least one terminal served by the associated network.

Figure 14:
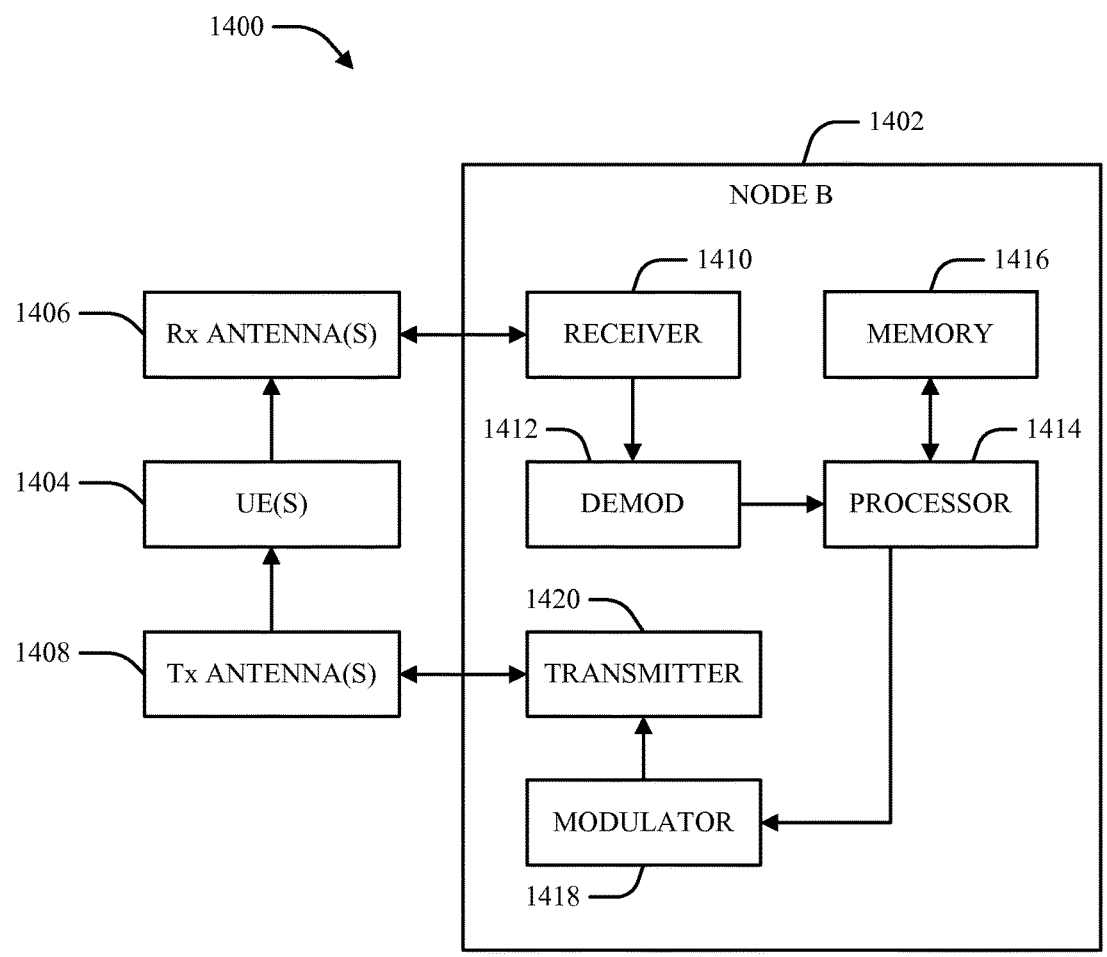
FIGS. 14-15 are block diagrams of respective wireless communication devices that can be utilized to implement various aspects described herein.

FIG. 14 is a block diagram of a system 1400 that can be utilized to implement various aspects of the functionality described herein. In one example, system 1400 includes a base station or Node B 1402. As illustrated, Node B 1402 can receive signal(s) from one or more UEs 1404 via one or more receive (Rx) antennas 1406 and transmit to the one or more UEs 1404 via one or more transmit (Tx) antennas 1408. Additionally, Node B 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. Additionally, Node B 1402 can employ processor 1414 to perform methodologies 900-1100 and/or other similar and appropriate methodologies. In one example, Node B 1402 can also include a modulator 1418 that can multiplex a signal for transmission by a transmitter 1420 through transmit antenna(s) 1408.

Figure 15:
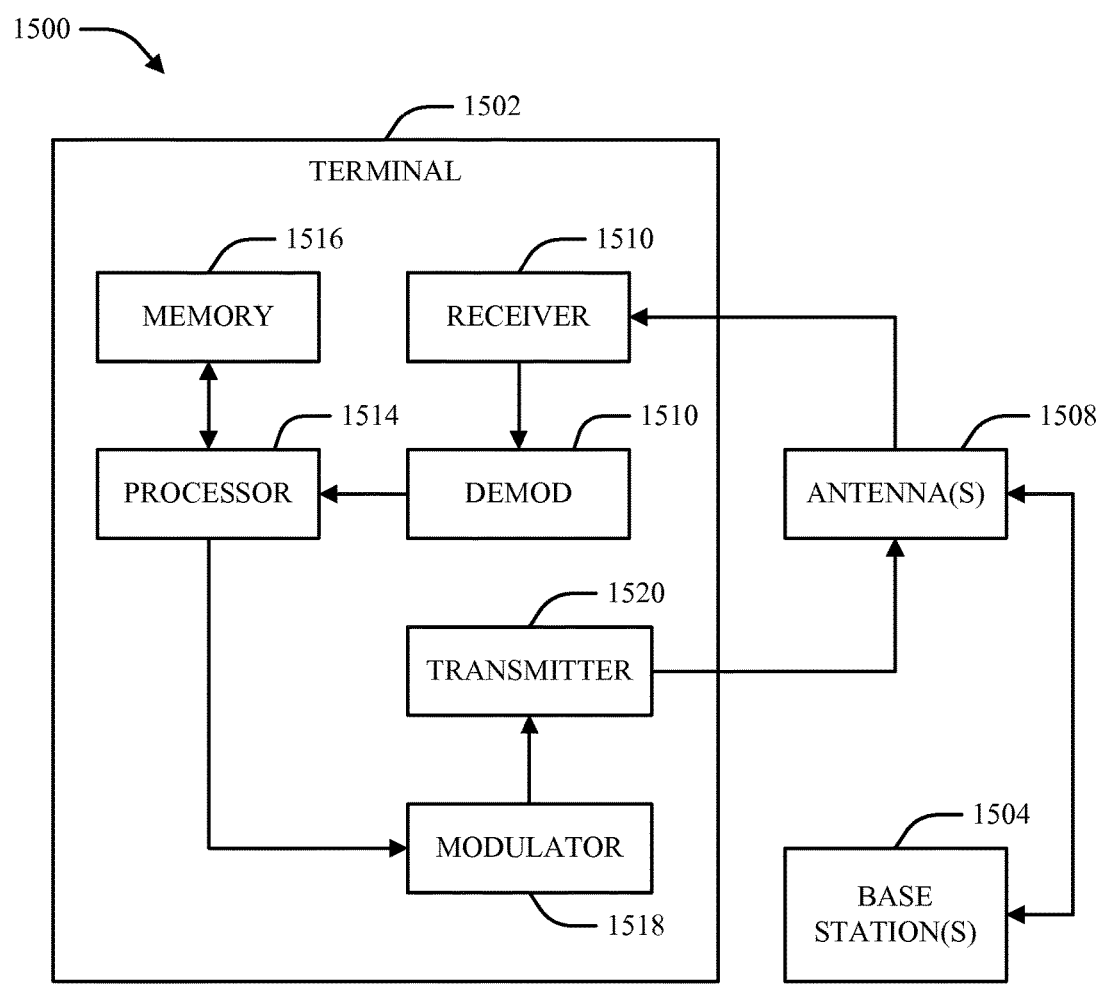

FIG. 15 is a block diagram of another system 1500 that can be utilized to implement various aspects of the functionality described herein. In one example, system 1500 includes a mobile terminal 1502. As illustrated, mobile terminal 1502 can receive signal(s) from one or more base stations 1504 and transmit to the one or more base stations 1504 via one or more antennas 1508. Additionally, mobile terminal 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to mobile terminal 1502. Additionally, mobile terminal 1502 can employ processor 1514 to perform methodologies 700-800 and/or other similar and appropriate methodologies. Mobile terminal 1502 can also include a modulator 1518 that can multiplex a signal for transmission by a transmitter 1520 through antenna(s) 1508.

Figure 16:
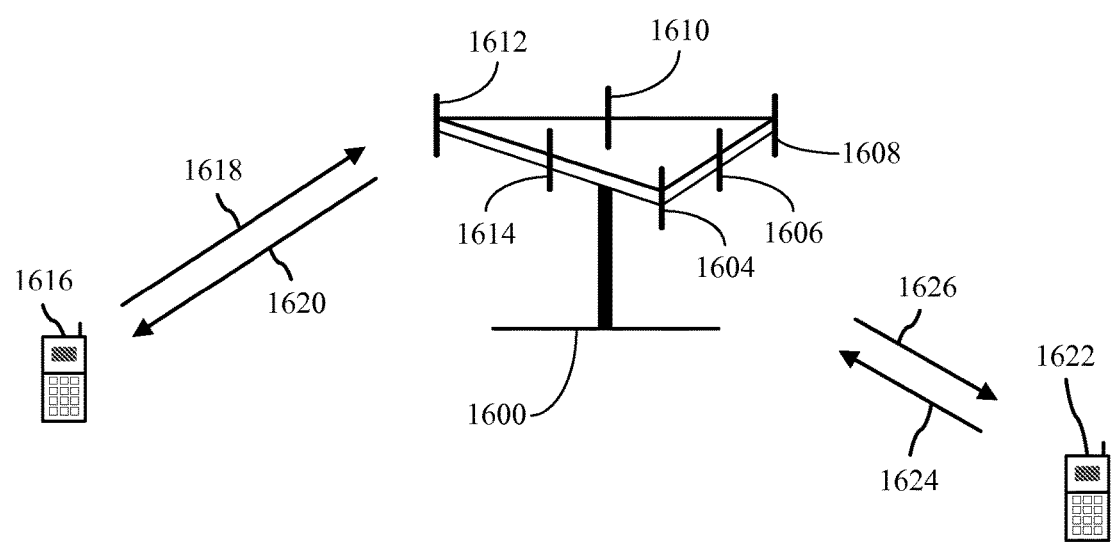
FIG. 16 illustrates a wireless multiple-access communication system in accordance with various aspects set forth herein.

Referring now to FIG. 16, an illustration of a wireless multiple-access communication system is provided in accordance with various aspects. In one example, an access point 1600 (AP) includes multiple antenna groups. As illustrated in FIG. 16, one antenna group can include antennas 1604 and 1606, another can include antennas 1608 and 1610, and another can include antennas 1612 and 1614. While only two antennas are shown in FIG. 16 for each antenna group, it should be appreciated that more or fewer antennas may be utilized for each antenna group. In another example, an access terminal 1616 can be in communication with antennas 1612 and 1614, where antennas 1612 and 1614 transmit information to access terminal 1616 over forward link 1620 and receive information from access terminal 1616 over reverse link 1618. Additionally and/or alternatively, access terminal 1622 can be in communication with antennas 1606 and 1608, where antennas 1606 and 1608 transmit information to access terminal 1622 over forward link 1626 and receive information from access terminal 1622 over reverse link 1624. In a frequency division duplex system, communication links 1618, 1620, 1624 and 1626 can use different frequency for communication. For example, forward link 1620 may use a different frequency then that used by reverse link 1618.

Each group of antennas and/or the area in which they are designed to communicate can be referred to as a sector of the access point. In accordance with one aspect, antenna groups can be designed to communicate to access terminals in a sector of areas covered by access point 1600. In communication over forward links 1620 and 1626, the transmitting antennas of access point 1600 can utilize beamforming in order to improve the signal-to-noise ratio of forward links for the different access terminals 1616 and 1622. Also, an access point using beamforming to transmit to access terminals scattered randomly through its coverage causes less interference to access terminals in neighboring cells than an access point transmitting through a single antenna to all its access terminals.

An access point, e.g., access point 1600, can be a fixed station used for communicating with terminals and can also be referred to as a base station, an eNB, an access network, and/or other suitable terminology. In addition, an access terminal, e.g., an access terminal 1616 or 1622, can also be referred to as a mobile terminal, user equipment, a wireless communication device, a terminal, a wireless terminal, and/or other appropriate terminology.

Figure 17:
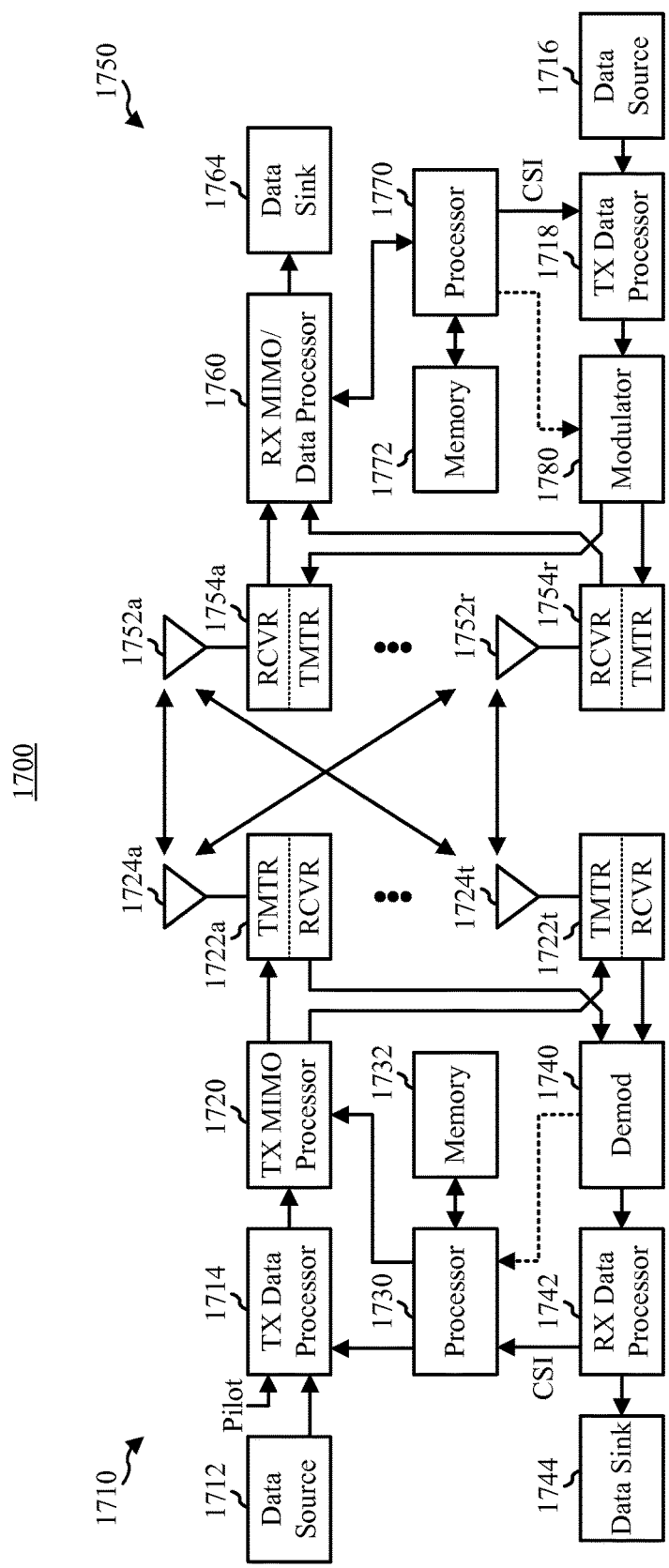
FIG. 17 is a block diagram illustrating an example wireless communication system in which various aspects described herein can function.

Referring now to FIG. 17, a block diagram illustrating an example wireless communication system 1700 in which various aspects described herein can function is provided. In one example, system 1700 is a multiple-input multiple-output (MIMO) system that includes a transmitter system 1710 and a receiver system 1750. It should be appreciated, however, that transmitter system 1710 and/or receiver system 1750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1710 and/or receiver system 1750 described herein could be utilized in connection with a single output to single input antenna system.

In accordance with one aspect, traffic data for a number of data streams are provided at transmitter system 1710 from a data source 1712 to a transmit (TX) data processor 1714. In one example, each data stream can then be transmitted via a respective transmit antenna 1724. Additionally, TX data processor 1714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1750 to estimate channel response. Back at transmitter system 1710, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1730.

Next, modulation symbols for all data streams can be provided to a TX processor 1720, which can further process the modulation symbols (e.g., for OFDM). TX MIMO processor 1720 can then provides $N_T$ modulation symbol streams to $N_T$ transceivers 1722a through 1722t. In one example, each transceiver 1722 can receive and process a respective symbol stream to provide one or more analog signals. Each transceiver 1722 can then further condition (e.g., amplify, filter, and upconvert) the analog signals to provide a modulated signal suitable for transmission over a MIMO channel. Accordingly, $N_T$ modulated signals from transceivers 1722a through 1722t can then be transmitted from $N_T$ antennas 1724a through 1724t, respectively.

In accordance with another aspect, the transmitted modulated signals can be received at receiver system 1750 by $N_R$ antennas 1752a through 1752r. The received signal from each antenna 1752 can then be provided to respective transceivers 1754. In one example, each transceiver 1754 can condition (e.g., filter, amplify, and downconvert) a respective received signal, digitize the conditioned signal to provide samples, and then processes the samples to provide a corresponding "received" symbol stream. An RX MIMO/data processor 1760 can then receive and process the $N_R$ received symbol streams from $N_R$ transceivers 1754 based on a particular receiver processing technique to provide $N_T$ "detected" symbol streams. In one example, each detected symbol stream can include symbols that are estimates of the modulation symbols transmitted for the corresponding data stream. RX processor 1760 can then process each symbol stream at least in part by demodulating, deinterleaving, and decoding each detected symbol stream to recover traffic data for a corresponding data stream. Thus, the processing by RX processor 1760 can be complementary to that performed by TX MIMO processor 1720 and TX data processor 1718 at transmitter system 1710. RX processor 1760 can additionally provide processed symbol streams to a data sink 1764.

In accordance with one aspect, the channel response estimate generated by RX processor 1760 can be used to perform space/time processing at the receiver, adjust power levels, change modulation rates or schemes, and/or other appropriate actions. Additionally, RX processor 1760 can further estimate channel characteristics such as, for example, signal-to-noise-and-interference ratios (SNRs) of the detected symbol streams. RX processor 1760 can then provide estimated channel characteristics to a processor 1770. In one example, RX processor 1760 and/or processor 1770 can further derive an estimate of the "operating" SNR for the system. Processor 1770 can then provide channel state information (CSI), which can comprise information regarding the communication link and/or the received data stream. This information can include, for example, the operating SNR. The CSI can then be processed by a TX data processor 1718, modulated by a modulator 1780, conditioned by transceivers 1754a through 1754r, and transmitted back to transmitter system 1710. In addition, a data source 1716 at receiver system 1750 can provide additional data to be processed by TX data processor 1718.

Back at transmitter system 1710, the modulated signals from receiver system 1750 can then be received by antennas 1724, conditioned by transceivers 1722, demodulated by a demodulator 1740, and processed by a RX data processor 1742 to recover the CSI reported by receiver system 1750. In one example, the reported CSI can then be provided to processor 1730 and used to determine data rates as well as coding and modulation schemes to be used for one or more data streams. The determined coding and modulation schemes can then be provided to transceivers 1722 for quantization and/or use in later transmissions to receiver system 1750. Additionally and/or alternatively, the reported CSI can be used by processor 1730 to generate various controls for TX data processor 1714 and TX MIMO processor 1720. In another example, CSI and/or other information processed by RX data processor 1742 can be provided to a data sink 1744.

In one example, processor 1730 at transmitter system 1710 and processor 1770 at receiver system 1750 direct operation at their respective systems. Additionally, memory 1732 at transmitter system 1710 and memory 1772 at receiver system 1750 can provide storage for program codes and data used by processors 1730 and 1770, respectively. Further, at receiver system 1750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    wirelessly obtaining, by a wireless terminal, one or more access rules relating to a network from a node of the network configured to communicate with one or more wireless terminals over an air-interface, the one or more access rules specifying a rate at which permitted accesses to the network accumulate specified as an amount of permitted accesses per unit of time; and after the one or more access rules are obtained, selectively allowing, by the wireless terminal, a request to access the network upon determining that a number of permitted accesses accumulated according to the rate at which the permitted accesses to the network accumulate is greater than or equal to a predefined number of permitted accesses required for allowing the request to access the network, the access being a wireless access from the wireless terminal to the network, wherein the wireless terminal is a wireless device configured to provide voice and/or data connectivity to a user of the wireless terminal.

2. The method of claim 1, wherein:

the wirelessly obtaining comprises wirelessly obtaining from the node of the network respective access rules that specify the rate at which the permitted accesses to the network accumulate for respective packet flows specified as respective amounts of permitted accesses per unit of time for the respective packet flows; and the selectively allowing further comprises:

identifying a packet flow associated with the request to access the network, and selectively allowing the request to access the network upon determining that the number of accumulated permitted accesses determined according to the rate at which the permitted accesses to the network accumulate for the packet flow associated with the request to access the network is greater than or equal to the predefined number of permitted accesses required for allowing the request to access the network.

3. The method of claim 2, further comprising:

wirelessly obtaining, by the wireless terminal from the node of the network, a common access accumulation rule which specifies the rate at which the permitted accesses to the network accumulate for common accesses; and allowing, by the wireless terminal, the request to access the network upon determining that the request is a page response and that the number of accumulated permitted accesses for the common accesses determined according to the common access accumulation rule is greater than or equal to the predefined number of permitted accesses.

4. The method of claim 1, wherein:

the wirelessly obtaining comprises wirelessly obtaining from the node of the network an access persistence threshold value; and the selectively allowing further comprises:

generating an access persistence priority value corresponding to the request to access the network; and selectively allowing the request to access the network upon determining that the number of accumulated permitted accesses determined according to the rate at which the permitted accesses to the network accumulate is greater than or equal to the predefined number of permitted accesses required for allowing the request to access the network and that the access persistence priority value is less than the access persistence threshold value.

5. The method of claim 1, further comprising determining, by the wireless terminal, the number of accumulated permitted accesses according to the rate at which the permitted accesses to the network accumulate.

6. The method of claim 5, wherein the determining comprises:

determining an elapsed time from a previous request to access the network;

computing a number of additional accumulated permitted accesses as a function of the elapsed time from the previous request to access the network and the rate at which the permitted accesses to the network accumulate; and adding the number of additional accumulated permitted accesses to a number of previously accumulated permitted accesses to the network.

7. The method of claim 6, wherein:

the wirelessly obtaining comprises wirelessly obtaining from the node of the network one or more access rules specifying a maximum number of permitted accesses; and the adding comprises adding the number of additional accumulated permitted accesses to the number of previously accumulated permitted accesses subject to the maximum number of permitted accesses.

8. The method of claim 6, further comprising subtracting, by the wireless terminal, the predefined number of permitted accesses required for allowing a request to access the network from the number of accumulated permitted accesses upon allowing the request to access the network.

9. The method of claim 5, further comprising denying, by the wireless terminal, the request to access the network upon determining that the number of accumulated permitted accesses is less than the predefined number of permitted accesses required for allowing the request to access the network.

10. The method of claim 9, wherein the denying comprises denying the request to access the network pending accumulation of sufficient permitted accesses.

11. The method of claim 1, further comprising:

wirelessly obtaining, by the wireless terminal from the node of the network, a skip check rule which specifies that the wireless terminal skip checking of accrued permitted accesses when responding to a page; and allowing, by the wireless terminal, the request to access the network upon without determining whether or not the number of accumulated permitted accesses is greater than or equal to the predefined number of permitted accesses when the request is a page response and the skip check rule has been received.

12. The method of claim 1, further comprising:

wirelessly obtaining, by the wireless terminal from the node of the network, an access persistence threshold value and a persistence offset value;

generating an access persistence value corresponding to the request to access the network;

adjusting the access persistence value by the persistence offset value; and allowing the request to access the network upon determining that the number of accumulated permitted accesses is greater than or equal to the predefined number of permitted accesses, and that the adjusted access persistence value is less than the access persistence threshold value.

13. The method of claim 12, further comprising:
wirelessly obtaining from the node of the network a reverse link load information; and
adjusting, based on the reverse link load information, the access persistence threshold value, or the persistence offset value, or both.

14. A wireless terminal, comprising:
a memory that stores data relating to an associated network and one or more rates of accrual for permitted accesses to the associated network given in terms of permitted accesses to the associated network per unit of time, the data being wirelessly received from a node of the associated network configured to communicate with one or more wireless terminals over an air-interface; and
a processor configured, after the data are received,
   to identify a request to access the associated network, and
   to selectively allow the request to access the associated network upon determining that a number of permitted accesses that have accrued according to the one or more rates of accrual for the permitted accesses to the associated network is greater than or equal to a predefined number of permitted accesses required for allowing the request to access the associated network, the access being a wireless access from the wireless terminal to the associated network,
wherein the wireless terminal is a wireless device configured to provide voice and/or data connectivity to a user of the wireless terminal.

15. The wireless terminal of claim 14, wherein:
the memory is further configured to store data relating to the one or more rates of accrual for permitted accesses to the associated network via corresponding packet flows given in terms of permitted accesses to the associated network per unit of time via respective packet flows; and
the processor is further configured
   to identify a packet flow associated with the request to access the associated network, and
   to selectively allow the request to access the associated network upon determining that the number of permitted accesses that have accrued as determined according to the one or more rates of accrual for permitted accesses to the associated network via the packet flow associated with the request to access the associated network is greater than or equal to the predefined number of permitted accesses required for allowing the request to access the associated network via the packet flow.

16. The wireless terminal of claim 14, wherein:
the memory is further configured to store data relating to an access persistence threshold value; and
the processor is further configured
   to generate an access persistence priority value corresponding to the request to access the associated network, and
   to selectively allow the request to access the associated network upon determining that the number of permitted accesses to the associated network that have accrued according to the one or more rates of accrual for the permitted accesses to the associated network is greater than or equal to the predefined number of permitted accesses to the associated network required for allowing the request to access the associated network and that the access persistence priority value is less than the access persistence threshold value.

17. The wireless terminal of claim 14, wherein:
the memory is further configured to store data relating to a previous request to access the associated network; and
the processor is further configured
   to determine an elapsed time from the previous request to access the associated network,
   to compute a number of additional permitted accesses to the associated network that have accrued as a function of the elapsed time from the previous request to access the associated network and the one or more rates of accrual for the permitted accesses to the associated network, and
   to determine a number of permitted accesses to the associated network that have accrued at least in part by adding the number of additional permitted accesses to the associated network that have accrued to a number of previously accrued permitted accesses to the associated network.

18. The wireless terminal of claim 17, wherein:
the memory is further configured to store data relating to a maximum number of accrued permitted accesses to the associated network; and
the processor is configured to add the number of additional permitted accesses to the associated network that have accrued to the number of previously accrued permitted accesses to the associated network subject to the maximum number of accrued permitted accesses to the associated network.

19. The wireless terminal of claim 14, wherein the processor is further configured to receive wirelessly the one or more rates of accrual for the permitted accesses to the associated network from the associated network.

20. The wireless terminal of claim 14, wherein:
the memory is further configured to store a common access accumulation rule received from the node of the associated network, the common access accumulation rule specifying the rate at which the permitted accesses to the associated network accumulate for common accesses, and
the processor is further configured to allow the request to access the associated network upon determining
   that the request is a page response, and
   that the number of accumulated permitted accesses for the common accesses determined according to the common access accumulation rule is greater than or equal to the predefined number of permitted accesses.

21. The wireless terminal of claim 14, wherein:
the memory is further configured to store a skip check rule received from the node of the associated network, the skip check rule specifying that the wireless terminal skip checking of accrued permitted accesses when responding to a page, and
the processor is further configured to allow the request to access the associated network upon without determining whether or not the number of accumulated permitted accesses is greater than or equal to the predefined number of permitted accesses when the request is a page response and the skip check rule is stored in the memory.

22. The wireless terminal of claim 14, wherein:
the memory is further configured to store an access persistence threshold value and a persistence offset value received from the node of the associated network, and
the processor is further configured to
generate an access persistence value corresponding to the request to access the network;
adjust the access persistence value by the persistence offset value; and
allow the request to access the network upon determining
that the number of accumulated permitted accesses is greater than or equal to the predefined number of permitted accesses, and
that the adjusted access persistence value is less than the access persistence threshold value.

23. The wireless terminal of claim 14, wherein:
the memory is further configured to store reverse link load information received from the node of the associated network, and
the processor is further configured to adjust, based on the reverse link load information, the access persistence threshold, or the persistence offset, or both.

24. A wireless terminal, comprising:
means for receiving wirelessly from a node of a network information relating to an accumulation rate for access tokens associated with the network, the node of the network configured to communicate with one or more wireless terminals over an air interface, the accumulation rate for access tokens given as an amount of access tokens accumulated per unit of time, and the amount of access tokens accumulated specifying a rate of permitted accesses to the network per unit of time; and
a processor configured to execute instructions stored in memory for selectively allowing a request to access the network upon determining that a number of access tokens that have accumulated according to the accumulation rate for access tokens after the information is received is greater than or equal to a predefined number of access tokens required for allowing the request to access the network, the access being a wireless access from the wireless terminal to the network,
wherein the wireless terminal is a wireless device configured to provide voice and/or data connectivity to a user of the wireless terminal.

25. The wireless terminal of claim 24, wherein:
the means for receiving receive wirelessly from the node of the network respective accumulation rates for access tokens associated with the network corresponding to respective packet flows associated with the network, the respective accumulation rates for access tokens given as amounts of access tokens accumulated for the respective packet flows per unit of time; and
the instructions stored in the memory executed by the processor for selectively allowing identify a packet flow associated with the request to access the network compute an amount of accumulated access tokens according to the accumulation rate for access tokens for the packet flow associated with the request to access the network; and
selectively allow the request to access the network upon determining that at least the predefined number of access tokens required for allowing the request to access the network via the packet flow associated with the request to access the network has been accumulated.

26. The wireless terminal of claim 25, wherein:
the means for receiving receive wirelessly from the node of the network a common access accumulation rule specifying the rate at which the permitted accesses to the network accumulate for common accesses, and
the processor is configured to execute instructions stored in the memory to allow the request to access the network upon determining
that the request is a page response, and
that the number of accumulated permitted accesses for the common accesses determined according to the common access accumulation rule is greater than or equal to the predefined number of permitted accesses.

27. The wireless terminal of claim 24, wherein:
the means for receiving receive wirelessly from the node of the network an access persistence threshold value,
the processor is configured to execute instructions stored in the memory for generating an access persistence priority value corresponding to the request to access the network, and
the instructions stored in the memory executed by the processor for selectively allowing selectively allow the request to access the network upon determining that at least the predefined required number of access tokens have been accumulated according to the accumulation rate for access tokens and that the access persistence priority value is less than the access persistence threshold value.

28. The wireless terminal of claim 24, further comprising:
an access timer configured to determine an elapsed time from a previous request to access the network,
wherein the processor is configured to execute instructions stored in the memory
for computing an amount of newly accumulated access tokens as a function of the elapsed time from the previous request to access the network and the accumulation rate for access tokens; and
for identifying an amount of accumulated access tokens at least in part by adding the amount of newly accumulated access tokens to an amount of previously accumulated access tokens.

29. The wireless terminal of claim 24, wherein:
the means for receiving receive wirelessly from the node of the network a skip check rule specifying that the wireless terminal skip checking of accrued permitted accesses when responding to a page, and
the processor is configured to execute instructions stored in the memory to allow the request to access the network without determining whether or not the number of accumulated permitted accesses is greater than or equal to the predefined number of permitted accesses when the request is a page response and the skip check rule has been received.

30. The wireless terminal of claim 24, wherein:
the means for receiving receive wirelessly from the node of the network an access persistence threshold value and a persistence offset value, and
the processor is configured to execute instructions stored in the memory to
generate an access persistence value corresponding to the request to access the network, and
adjust the access persistence value by the persistence offset value, and
allow the request to access the associated network upon determining that the number of accumulated permitted accesses is greater than or equal to the predefined number of permitted accesses, and
that the adjusted access persistence value is less than the access persistence threshold value.

31. The wireless terminal of claim 30, wherein:
the means for receiving receive wirelessly from the node of the network reverse link load information, and
the processor is configured to execute instructions stored in the memory to adjust, based on the reverse link load information, the access persistence threshold, or the persistence offset, or both.

32. A non-transitory computer-readable medium having recorded therein codes, comprising:
code for causing a computer processor of a wireless terminal to receive wirelessly from a node of a network information relating to an accumulation rate for access tokens associated with the network, the node of the network configured to communicate with one or more wireless terminals over an air-interface, the accumulation rate for access tokens given as an amount of access tokens accumulated per unit of time wherein the amount of access tokens accumulated specifies a rate of permitted accesses to the network per unit of time; and
code for causing the computer processor to selectively allow a request to access the network upon determining that a number of access tokens that have accumulated according to the accumulation rate for access tokens after the information is received from the network is greater than or equal to a predefined number of access tokens required for allowing the request to access the network, the access being a wireless access from the wireless terminal to the network,
wherein the wireless terminal is a wireless device configured to provide voice and/or data connectivity a user of the wireless terminal.

33. The non-transitory computer-readable medium of claim 32, wherein:
the code for causing the computer processor to receive comprises code for causing the computer processor to receive wirelessly from the node of the network respective accumulation rates for access tokens associated with the network corresponding to respective packet flows associated with the network, the respective accumulation rates for access tokens given as amounts of access tokens accumulated for the respective packet flows per unit of time; and
the code for causing the computer processor to selectively allow comprises:
code for causing the computer processor to identify a packet flow associated with the request to access the network;
code for causing the computer processor to compute an amount of accumulated access tokens according to the accumulation rate for access tokens for the packet flow associated with the request to access the network; and
code for causing the computer processor to allow the request to access the network upon determining that at least the predefined number of access tokens required for allowing the request to access the network via the packet flow associated with the request to access the network has been accumulated.

34. The non-transitory computer-readable medium of claim 33, further comprising:
code for causing the computer processor to receive wirelessly from the node of the network a common access accumulation rule specifying the rate at which the permitted accesses to the network accumulate for common accesses; and
code for causing the computer processor to allow the request to access the network upon determining
that the request is a page response, and
that the number of accumulated permitted accesses for the common accesses determined according to the common access accumulation rule is greater than or equal to the predefined number of permitted accesses.

35. The non-transitory computer-readable medium of claim 32, further comprising:
code for causing the computer processor to receive wirelessly from the node of the network an access persistence threshold value and code for causing the computer processor to generate an access persistence priority value corresponding to the request to access the network,
wherein the code for causing the computer processor to selectively allow comprises code for causing the computer processor to selectively allow the request to access the network upon determining that at least the predefined required number of access tokens have been accumulated according to the accumulation rate for access tokens and that the access persistence priority value is less than the access persistence threshold value.

36. The non-transitory computer-readable medium of claim 32, further comprising:
code for causing the computer processor to receive wirelessly from the node of the network a skip check rule specifying that the wireless terminal skip checking of accrued permitted accesses when responding to a page; and
code for causing the computer processor to allow the request to access the network without determining whether or not the number of accumulated permitted accesses is greater than or equal to the predefined number of permitted accesses when the request is a page response and the skip check rule has been received.

37. The non-transitory computer-readable medium of claim 32, further comprising:
code for causing the computer processor to receive wirelessly from the node of the network an access persistence threshold value and a persistence offset value;
code for causing the computer processor to generate an access persistence value corresponding to the request to access the network;
code for causing the computer processor to adjust the access persistence value by the persistence offset value; and
code for causing the computer processor to allow the request to access the associated network upon determining
that the number of accumulated permitted accesses is greater than or equal to the predefined number of permitted accesses, and
that the adjusted access persistence value is less than the access persistence threshold value.

38. The non-transitory computer-readable medium of claim 37, further comprising:
code for causing the computer processor to receive wirelessly from the node of the network reverse link load information; and code for causing the computer processor to adjust, based on the reverse link load information, the access persistence threshold, or the persistence offset, or both.

39. A method (900), comprising:

defining (902), by an associated network configured to provide wireless services, one or more access rules relating to the associated network, the one or more access rules comprising a rate of accrual for permitted accesses to the associated network and a predefined number of permitted accesses; and conveying (904) wirelessly, by a node of the associated network, the one or more access rules to one or more wireless terminals prior to receiving a request to access the associated network from the one or more wireless terminals, each access being a wireless access from each of the one or more wireless terminals configured to provide voice and/or data connectivities to users of the one or more wireless terminals, wherein the node of the associated network is configured to communicate with the one or more wireless terminals over an air interface, and wherein each wireless terminal is required to accumulate a number of permitted accesses according to the rate of accrual for permitted access that is greater than or equal to the predefined number permitted accesses before that wireless terminal makes a request to access the associated network.

40. The method of claim 39, wherein the defining comprises:

identifying a plurality of packet flows utilized by the associated network; and defining respective rates of accrual for the permitted accesses to the associated network corresponding to respective packet flows in the plurality of packet flows.

41. The method of claim 39, wherein:

the defining comprises defining a threshold for access persistence values such that accesses to the associated network by a wireless terminal are selectively allowed by the wireless terminal according to an access persistence value generated by the wireless terminal in relation to the threshold for access persistence values; and the conveying comprises conveying wirelessly the threshold for access persistence values to the one or more wireless terminals.

42. The method of claim 41, wherein the defining further comprises adjusting, by the associated network, the threshold for access persistence values in relation to the rate of accrual for the permitted accesses to the associated network.

43. The method of claim 41, further comprising:

defining a persistence offset value to enable the wireless terminal to adjust the access persistence value by the persistence offset value when the number of permitted accesses accrued by the wireless terminal is greater than or equal to the predefined number of permitted accesses, and allow accesses to the associated network by the wireless terminal when the adjusted access persistence value is less than the access persistence threshold value; and conveying wirelessly the persistence offset value to the one or more wireless terminals.

44. The method of claim 39, wherein the one or more access rules facilitate selective allowance by the wireless terminals of accesses to the associated network based on the rate of accrual for the permitted accesses to the associated network.

45. The method of claim 44, wherein the one or more access rules further facilitate allowance of an access to the associated network by a wireless terminal when the wireless terminal has accrued a permitted access to the associated network and denial of the access to the associated network by the wireless terminal when the wireless terminal has not accrued the permitted access to the associated network.

46. The method of claim 45, wherein the one or more access rules further facilitate removal by the wireless terminal of an accrued permitted access to the associated network corresponding to the wireless terminal upon allowance of the access to the associated network by the wireless terminal.

47. The method of claim 39, wherein the defining comprises adjusting the rate of accrual for the permitted accesses to the associated network as a function of network loading.

48. The method of claim 47, wherein the adjusting comprises:

increasing the rate of accrual for the permitted accesses to the associated network upon detecting a decrease in loading of the associated network; and decreasing the rate of accrual for the permitted accesses to the associated network upon detecting an increase in loading of the associated network.

49. The method of claim 39, further comprising:

defining a skip check rule specifying that the wireless terminal skip checking of accrued permitted accesses when responding to a page; and conveying wirelessly the skip check rule to the one or more wireless terminals.

50. A node of a network, comprising:

a memory configured to store data relating to at least one wireless terminal and the network configured to provide wireless services, the at least one wireless terminal configured to provide voice and/or data services to a user of the wireless terminal; and a processor configured to define one or more access rules relating to the network, the one or more access rules comprising a rate of accrual for permitted accesses to the network and a predefined number of permitted accesses, and to convey wirelessly the one or more access rules to the at least one wireless terminal prior to receiving a request to access the network from the at least one wireless terminal, an access being a wireless access from the at least one wireless terminal to the network, wherein the node of the network is configured to communicate with the one or more wireless terminals over an air interface, and wherein the at least one wireless terminal is required to accumulate a number of permitted accesses according to the rate of accrual for the permitted accesses that is greater than or equal to the predefined number of permitted accesses before the at least one wireless terminal makes a request to access the network.

51. The node of claim 50, wherein:

the memory is further configured to store data relating to a plurality of packet flows utilized by the network; and the processor is further configured to define respective rates of accrual for the permitted accesses to the network corresponding to respective packet flows in the plurality of packet flows.

52. The node of claim 50, wherein the processor is further configured to define a threshold for access persistence values such that accesses to the network conducted by the at least one wireless terminal are selectively allowed according to an access persistence value generated by the at least one wireless terminal in relation to the threshold for access persistence values, and to convey wirelessly the threshold for access persistence values to the at least one wireless terminal.

53. The node of claim 52, wherein the processor is further configured to adjust the threshold for access persistence values in relation to the rate of accrual for the permitted accesses to the network.

54. The node of claim 52, wherein the processor is further configured to define a persistence offset value to
enable the at least one wireless terminal to adjust the access persistence value by the persistence offset value when the number of permitted accesses accrued by the at least one wireless terminal is greater than or equal to the predefined number of permitted accesses, and
allow accesses to the associated network by the at least one wireless terminal when the adjusted access persistence value is less than the access persistence threshold value, and convey wirelessly the persistence offset value to the at least one wireless terminal.

55. The node of claim 50, wherein the one or more access rules facilitate selective allowance by the at least one wireless terminal of accesses to the network based on the rate of accrual for the permitted accesses to the network.

56. The node of claim 50, wherein the processor is further configured to adjust the rate of accrual for the permitted accesses to the network as a function of network loading.

57. The node of claim 50, wherein the processor is further configured to define a skip check rule specifying that the wireless terminal skip checking of accrued permitted accesses when responding to a page, and
convey wirelessly the skip check rule to the at least one wireless terminal.

58. An apparatus of an associated network, comprising:
a processor configured to execute instructions stored in memory for defining a predefined number of permitted accesses and an accumulation rate for permitted access requests utilized by the associated network configured to provide wireless services, the accumulation rate specifying a rate of permitted accesses to the associated network per unit of time; and
means for advertising (1304) wirelessly the predefined number of permitted accesses and the accumulation rate for the permitted access requests to at least one wireless terminal served by the associated network prior to receiving a request to access the associated network from the at least one wireless terminal, the at least one wireless terminal configured to provide voice and/or data services to a user of the at least one wireless terminal, an access being a wireless access from the at least one wireless terminal to the associated network,
wherein the apparatus of the associated network is configured to communicate with one or more wireless terminals over an air interface, and
wherein the at least one wireless terminal is required to accumulate a number of permitted accesses according to the accumulation rate for the permitted accesses that is greater than or equal to the predefined number of permitted accesses before the at least one wireless terminal makes a request to access the network.

59. The apparatus of claim 58, wherein the instructions stored in the memory executed by the processor for defining identify respective packet flows associated with the associated network; and
define respective accumulation rates for permitted access requests utilized by the associated network corresponding to the respective packet flows associated with the associated network.

60. The apparatus of claim 58, wherein:
the instructions stored in the memory executed by the processor for defining define an access persistence threshold parameter such that requested accesses to the associated network are selectively allowed by the at least one wireless terminal according to a generated access persistence probability parameter in relation to the access persistence threshold parameter; and
the means for advertising advertise wirelessly the access persistence threshold parameter to the at least one wireless terminal served by the associated network.

61. The apparatus of claim 60, wherein the instructions stored in the memory executed by the processor for defining adjust the access persistence threshold parameter in relation to the accumulation rate for the permitted access requests utilized by the associated network.

62. The apparatus of claim 60, wherein:
the processor is configured to execute instructions stored in the memory for defining a persistence offset value to
enable the at least one wireless terminal to adjust the access persistence value by the persistence offset value when the number of permitted accesses accrued by the at least one wireless terminal is greater than or equal to the predefined number of permitted accesses, and
allow accesses to the associated network by the at least one wireless terminal when the adjusted access persistence value is less than the access persistence threshold value, and
the means for advertising advertise wirelessly the persistence offset value to the at least one wireless terminal served by the associated network.

63. The apparatus of claim 58, wherein the instructions stored in the memory executed by the processor for defining adjust the accumulation rate for the permitted access requests utilized by the associated network as a function of network loading.

64. The node of claim 50, wherein:
the processor is configured to execute instructions stored in the memory for defining a skip check rule specifying that the wireless terminal skip checking of accrued permitted accesses when responding to a page, and
the means for advertising advertise wirelessly the skip check rule to the at least one wireless terminal served by the associated network.

65. A non-transitory computer-readable medium having recorded therein codes, comprising:
code for causing a computer processor of a node of an associated network to define a predefined number of permitted accesses and an accumulation rate for permitted access requests utilized by the associated network configured to provide wireless services, the accumulation rate specifying a rate of permitted accesses to the associated network per unit of time; and
code for causing the computer processor to advertise wirelessly the predefined number of permitted accesses and the accumulation rate for the permitted access requests to at least one wireless terminal prior to receiving a request to access the associated network from the at least one wireless terminal, the at least one wireless terminal configured to provide voice and/or data services to a user of the at least one wireless terminal, the associated network wirelessly serving the at least one wireless terminal, and an access being a wireless access from the at least one wireless terminal to the associated network, wherein the node of the associated network is configured to communicate with one or more wireless terminals over an air interface, and wherein the at least one wireless terminal is required to accumulate a number of permitted accesses according to the accumulation rate for the permitted accesses that is greater than or equal to the predefined number of permitted accesses before the at least one wireless terminal makes a request to access the network.

66. The non-transitory computer-readable medium of claim 65, wherein the code for causing the computer processor to define comprises:
code for causing the computer processor to identify respective packet flows associated with the associated network; and
code for causing the computer processor to define the respective accumulation rates for permitted access requests utilized by the associated network corresponding to the respective packet flows associated with the associated network.

67. The non-transitory computer-readable medium of claim 65, wherein:
the code for causing the computer processor to define comprises code for causing the computer processor to define an access persistence threshold parameter such that requested accesses to the associated network are selectively allowed by the at least one wireless terminal according to a generated access persistence probability parameter in relation to the access persistence threshold parameter; and
the code for causing the computer processor to advertise comprises code for causing the computer processor to advertise wirelessly the access persistence threshold parameter to the at least one wireless terminal.

68. The non-transitory computer-readable medium of claim 67, wherein the code for causing the computer processor to define further comprises code for causing the computer processor to adjust the access persistence threshold parameter in relation to the accumulation rate for the permitted access requests utilized by the associated network.

69. The non-transitory computer-readable medium of claim 67, further comprising:
code for causing the computer processor to define a persistence offset value to
enable the at least one wireless terminal to adjust the access persistence value by the persistence offset value when the number of permitted accesses accrued by the at least one wireless terminal is greater than or equal to the predefined number of permitted accesses, and
allow accesses to the associated network by the at least one wireless terminal when the adjusted access persistence value is less than the access persistence threshold value; and
code for causing the computer processor to advertise wirelessly the persistence offset value to the at least one wireless terminal.

70. The non-transitory computer-readable medium of claim 65, wherein the code for causing the computer processor to define comprises code for causing the computer processor to adjust the accumulation rate for the permitted access requests utilized by the associated network as a function of network loading.

71. The non-transitory computer-readable medium of claim 65, further comprising:
code for causing the computer processor to define a skip check rule specifying that the wireless terminal skip checking of accrued permitted accesses when responding to a page; and
code for causing the computer processor to advertise wirelessly the skip check rule to the at least one wireless terminal.

* * * * *